US012168516B2

(12) United States Patent
Ruiz Lara et al.

(10) Patent No.: US 12,168,516 B2
(45) Date of Patent: Dec. 17, 2024

(54) LATCHING FOR A LAVATORY CONVERTIBLE DIVIDER WALL

(71) Applicant: B/E AEROSPACE, INC., Winston Salem, NC (US)

(72) Inventors: Oscar Ruiz Lara, Kirkland, WA (US); Travis John Vaninetti, Bothell, WA (US); Brent Ellis, Bothell, WA (US); Scott Marley, Edmonds, WA (US); Alexander Lei Velet, Clemmons, NC (US)

(73) Assignee: B/E AEROSPACE, INC., Winston Salem, NC (US)

( * ) Notice: Subject to any disclaimer, the term of this patent is extended or adjusted under 35 U.S.C. 154(b) by 49 days.

(21) Appl. No.: 17/988,534

(22) Filed: Nov. 16, 2022

(65) Prior Publication Data

US 2024/0158082 A1    May 16, 2024

(51) Int. Cl.
*B64D 11/02* (2006.01)
*B64D 11/00* (2006.01)
(Continued)

(52) U.S. Cl.
CPC .......... *B64D 11/02* (2013.01); *B64D 11/0023* (2013.01); *E05C 1/06* (2013.01); *E05C 9/041* (2013.01); *E06B 3/481* (2013.01)

(58) Field of Classification Search
CPC ....... B64D 11/02; B64D 11/0023; E05C 1/06; E05C 1/0004; E05C 1/02; E05C 1/065;
(Continued)

(56) References Cited

U.S. PATENT DOCUMENTS

| 9,045,231 B2 | 6/2015 | Swain |
| 11,377,213 B2 | 7/2022 | Hough et al. |

(Continued)

FOREIGN PATENT DOCUMENTS

| CA | 2197167 | 8/1997 |
| EP | 2974960 | 1/2016 |

(Continued)

OTHER PUBLICATIONS

European Patent Office, European Search Report dated Feb. 26, 2024 in Application No. 23210329.1.

*Primary Examiner* — Joshua J Michener
*Assistant Examiner* — Ashesh Dangol
(74) *Attorney, Agent, or Firm* — SNELL & WILMER L.L.P.

(57) ABSTRACT

An aircraft lavatory monument is provided that includes a first lavatory including a first door providing access to the first lavatory from an aisle of an aircraft; a second lavatory proximate the first lavatory, the second lavatory including a second door providing access to the second lavatory from the aisle of the aircraft; and a movable wall disposed between the first lavatory and the second lavatory, the movable wall including a latching mechanism positioned on an exterior edge of the movable wall and accessible from the aisle of the aircraft, where the latching mechanism, responsive to being in a locked position, causes the movable wall to be positioned at a first position separating the first lavatory from the second lavatory and providing privacy therebetween, and where the latching mechanism, responsive to being in an unlocked position, allows the movable wall to collapse thereby forming an enlarged bathroom space.

19 Claims, 20 Drawing Sheets

(51) Int. Cl.
   *E05C 1/06*     (2006.01)
   *E05C 9/04*     (2006.01)
   *E06B 3/48*     (2006.01)

(58) Field of Classification Search
   CPC .......... E05C 1/14; E05C 1/145; E04B 1/6183;
            E04B 1/6116; E04B 1/6141; E04B
            1/6162; E04B 2002/7487; E04B 1/344;
                    E04H 1/1216; F16B 5/008
   See application file for complete search history.

(56)            References Cited

U.S. PATENT DOCUMENTS

| | | |
|---|---|---|
| 2005/0016067 A1 | 1/2005 | Pettit et al. |
| 2013/0257065 A1* | 10/2013 | Burd ...................... B64D 11/04 |
| | | 292/145 |
| 2015/0136903 A1 | 5/2015 | Schliwa et al. |
| 2016/0039522 A1 | 2/2016 | Koyama et al. |
| 2019/0359335 A1* | 11/2019 | Hough ............... B64D 11/0023 |
| 2020/0115029 A1* | 4/2020 | Movsesian .......... E05B 65/0035 |
| 2021/0403165 A1 | 12/2021 | Scoley et al. |

FOREIGN PATENT DOCUMENTS

| | | |
|---|---|---|
| WO | 2013149072 | 10/2013 |
| WO | 2019213136 | 11/2019 |

\* cited by examiner

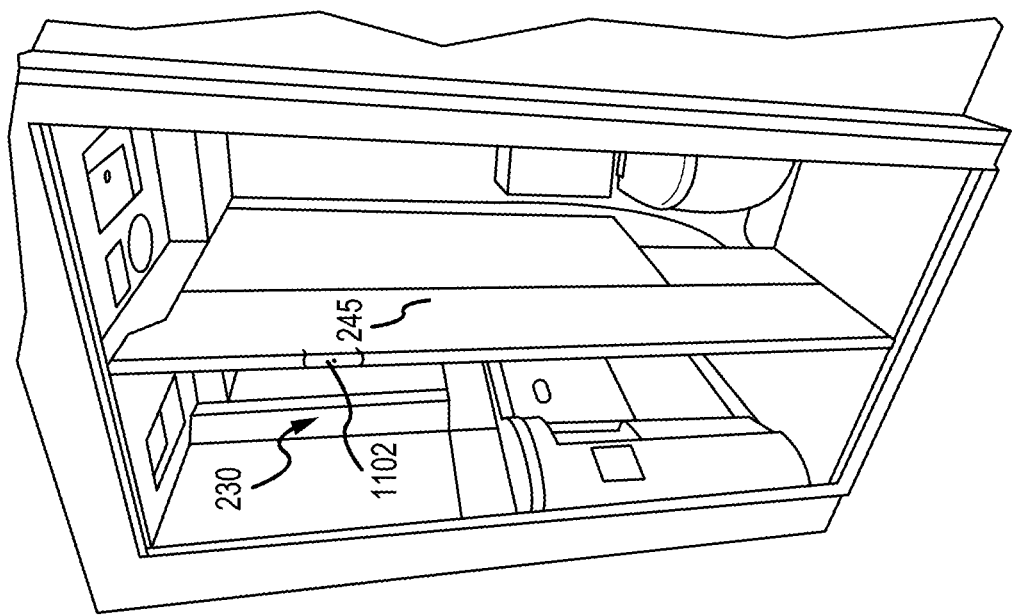
FIG.11A
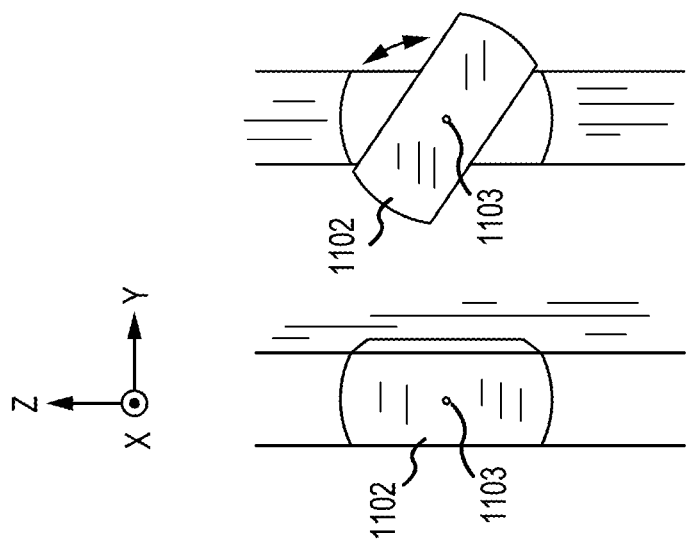

LATCHING FOR A LAVATORY CONVERTIBLE DIVIDER WALL

FIELD

The present disclosure generally relates occupancy detection in lavatories, and more specifically to latching for a lavatory convertible divider wall.

BACKGROUND

A lavatory complex installed in an aircraft may be located against an outboard wall portion of an aircraft passenger cabin as well as the rear of the aircraft abutting the pressure dome. For ease of manufacture and ease of installation adjacent other interior structures, aircraft lavatories typically have flat walls on all sides facing the aircraft interior as depicted by the lavatory envelope. Aircraft lavatories are typically located adjacent a doorway emergency exit path.

To provide a space for a crew member to stand by an emergency exit door for the purpose assisting passengers during an emergency evacuation of an aircraft, airworthiness authorities require that a 12-inch (30.48 centimeters) by 20-inch (50.8 centimeters) "assist space" be provided adjacent the aircraft exit doorway, alongside the exit path but outside the exit path itself. Attendant seats, occupied by flight attendants during takeoff, landing and at other times are typically mounted inboard of the assist spaces near the exit paths. The attendant seats most typically fold upward to a stowed position when not occupied so as to remain clear of the exit path.

Typical lavatory complexes comprise two lavatories which are configured with similar or identical water supply and sewage systems and structural layouts to minimize production cost and certification effort. Each lavatory in the lavatory complex may be a physically separate structural unit with a gap designed therebetween to minimize the possibility that the units will contact one another during flight and/or emergency landing situations.

A variety of techniques have been employed for transferring a mobility-impaired passenger between an aisle wheelchair and a toilet. A 90° transfer in which the aisle wheelchair is positioned at a 90° angle to the toilet and an assistant lifts the mobility-impaired passenger and rotates the passenger onto the toilet, and vice versa, has been found to reduce the risk of injury to the assistant and is, therefore, a favored method for assisted transfers. A lateral transfer, in which a mobility-impaired passenger slides sideways from wheelchair to toilet and vice versa can be favored for an unassisted transfer in which the mobility-impaired passenger prefers to make the transfer unaided and has the upper body strength to do so.

Existing lavatory solutions for persons with reduced mobility (PRM) include a wall at a centerline of the lavatory complex on a twin aisle aircraft, and a dedicated aft lavatory or galley complex on a narrow body aircraft. PRM lavatories, located against the outboard wall portion of the aircraft, are typically single oversized units which occupy an enlarged footprint in the aircraft cabin.

Conventionally, a PRM lavatory may include an outboard folding removable center wall. Such removable wall is difficult to fold and remove. A substantial effort and space is needed to fold the wall and move it outside the lavatory. To build a PRM lavatory, generally an existing footprint or layout of a typical lavatory needs to be modified. That, in turn, requires relocating utilities such as electrical conduits, water supplies and drain systems.

SUMMARY

Disclosed herein is an aircraft lavatory monument, including a first lavatory including a first door providing access to the first lavatory from an aisle of an aircraft; a second lavatory proximate the first lavatory, the second lavatory including a second door providing access to the second lavatory from the aisle of the aircraft; and a movable wall disposed between the first lavatory and the second lavatory, the movable wall including a latching mechanism positioned on an exterior edge of the movable wall and accessible from the aisle of the aircraft. In various embodiments, the latching mechanism, responsive to being in a locked position, causes the movable wall to be positioned at a first position separating the first lavatory from the second lavatory and providing privacy therebetween. In various embodiments, the latching mechanism, responsive to being in an unlocked position, allows the movable wall to collapse thereby forming an enlarged bathroom space including the first lavatory and the second lavatory.

In various embodiments, the latching mechanism is two latching mechanisms and a first of the two latching mechanisms is located toward an upper portion of the exterior edge of the movable wall and accessible from the aisle of the aircraft. In various embodiments, the latching mechanism includes a handle portion, a linking portion, and a pin portion and, in the locked position, the handle portion is positioned within the exterior edge of the movable wall forcing the pin portion into a slot of a ceiling or a floor of the aircraft via the linking portion. In various embodiments, in the unlocked position, the handle portion extends from the exterior edge of the movable wall forcing the pin portion out of the slot of the ceiling or the floor of the aircraft via the linking portion.

In various embodiments, the latching mechanism includes a handle portion, a circular portion, and a pin portion, in the locked position, the handle portion is positioned within the exterior edge of the movable wall forcing a distal end of the pin portion into a slot of a ceiling or a floor of the aircraft via a slot in the circular portion, and, in the locked position, a proximal end of the pin portion is positioned a first distance within the circular portion. In various embodiments, in the unlocked position, the handle portion extends from the exterior edge of the movable wall forcing the distal end of the pin portion out of the slot of the ceiling or the floor of the aircraft via the slot in the circular portion, and, in the unlocked position, the proximal end of the pin portion is positioned a second distance within the circular portion, where the second distance is greater than the first distance.

In various embodiments, the latching mechanism includes a handle portion and a pin portion and, in the locked position, the handle portion is positioned within the exterior edge of the movable wall forcing the pin portion into a slot of a ceiling or a floor of the aircraft via a slot in the handle portion. In various embodiments, in the unlocked position, the handle portion extends from the exterior edge of the movable wall forcing the pin portion out of the slot of the ceiling or the floor of the aircraft via the slot in the handle portion.

In various embodiments, the latching mechanism includes a tab portion, a bolt portion, and a pin portion, where the tab portion rotates to about a face portion of the bolt portion, and, responsive to force being applied to the tab portion, the bolt portion rotates forcing the pin portion out of a slot of a floor of the aircraft.

In various embodiments, the latching mechanism includes a handle portion, a shaft portion, a gear portion, and at least one pin portion and, in the locked position, the handle portion is position within the exterior edge of the movable wall such that the gear portion that is coupled to the handle portion via the shaft portion forces the at least one pin portion into a slot of a ceiling or a floor of the aircraft. In various embodiments, in the unlocked position, the handle portion rotates so as to extend from sides of the movable wall and thereby rotate the shaft portion and the gear portion such that the gear portion that is coupled to the handle portion via the shaft portion forces the at least one pin portion out of the slot of the ceiling or the floor of the aircraft.

In various embodiments, the latching mechanism includes a handle portion, a shaft portion, a gear portion, and at least one pin portion and, in the locked position, the handle portion is position within the exterior edge of the movable wall such that the gear portion that is coupled to the handle portion via the shaft portion forces the at least one pin portion into a slot of a ceiling or a floor of the aircraft. In various embodiments, in the unlocked position, the handle portion rotates so as to extend from the exterior edge of the movable wall and thereby rotate the shaft portion and the gear portion such that the gear portion that is coupled to the handle portion via the shaft portion forces the at least one pin portion out of the slot of the ceiling or the floor of the aircraft.

In various embodiments, the latching mechanism includes a handle portion and a pin portion and, in the locked position, the handle portion is position within the exterior edge of the movable wall forcing the pin portion into a slot of a ceiling or a floor of the aircraft. In various embodiments, in the unlocked position, the handle portion extends from the exterior edge of the movable wall forcing the pin portion out of the slot of the ceiling or the floor of the aircraft.

In various embodiments, the movable wall includes a front panel and a kickout panel and where the front panel includes a pin that, in the locked position, protrudes from a distal end of the front panel engaging a slot in the kickout panel thereby preventing the kickout panel from rotating. In various embodiments, the pin, in the locked position, retracts into the front panel from the slot in the kickout panel thereby allowing the kickout panel to rotate.

In various embodiments, the movable wall includes a front panel, a rear panel, and a kickout panel, where the rear panel includes a first pin, where the kickout panel includes a second pin, where, responsive to the front panel being in the locked position, the front panel causes the first pin to protrude from a distal end of the rear panel thereby engaging a first slot in a frame segment of the aircraft and preventing the rear panel from rotating, and, responsive to the front panel being in the locked position, the front panel causes the second pin to protrude from the distal end of the kickout panel thereby engaging a second slot in the frame segment of the aircraft and preventing the kickout panel from rotating. In various embodiments, responsive to the front panel being in the unlocked position, the front panel causes the first pin to retract into the rear panel thereby disengaging the first pin from the first slot in the frame segment of the aircraft and allowing the rear panel to rotate, and, responsive to the front panel being in the unlocked position, the front panel causes the second pin to retract into the kickout panel thereby disengaging the second pin from the second slot in the frame segment of the aircraft and allowing the kickout panel to rotate.

Also disclose herein is a system for locking and unlocking a movable wall of a lavatory monument within an aircraft, the method including: transitioning a latching mechanism positioned on an exterior edge of the movable wall and accessible from an aisle of the aircraft from a first position to a second position, where, in the first position, the movable wall to be positioned to separate a first lavatory from a second lavatory thereby providing privacy therebetween, and where, in the second position, the movable wall collapses thereby forming an enlarged bathroom space including the first lavatory and the second lavatory.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 11A and 11B illustrate latching mechanisms on a movable wall of a lavatory monument, in accordance with various embodiments.

DETAILED DESCRIPTION

Figure 1:
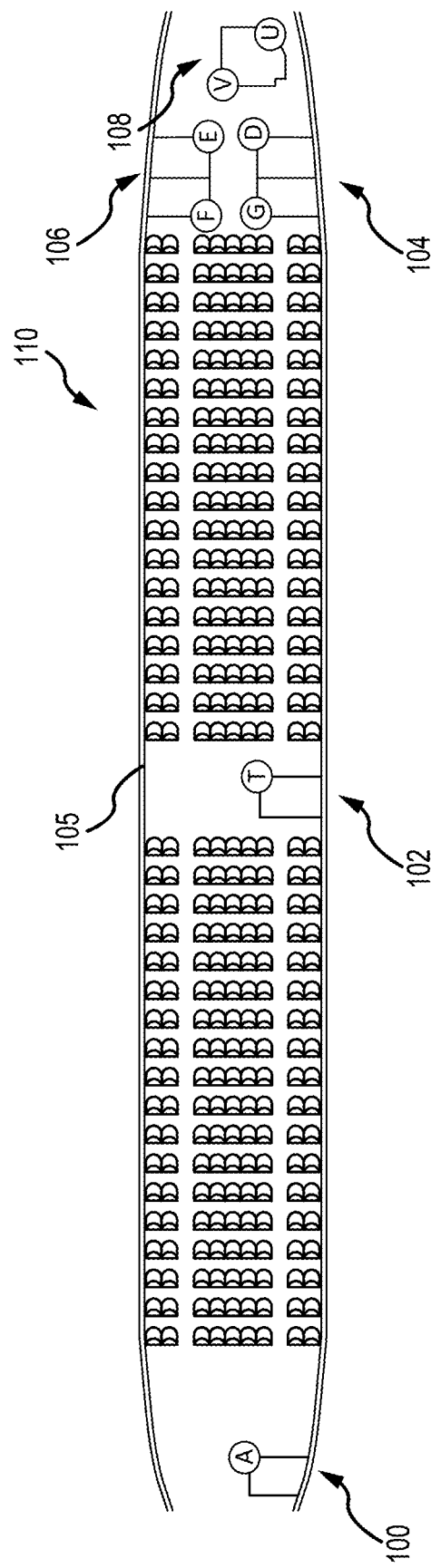
FIG. 1 illustrates a partial top view of an aircraft cabin with an exemplary lavatory outboard dual monument, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

A persons with reduced mobility (PRM) lavatory may include an outboard folding movable center wall. However, such a movable wall could be difficult to fold and move. When used to create two independent lavatories, this movable wall should ensure that no passenger can unlatch the door from one side and intrude or peek into the other lavatory's space. The solution currently used to avoid this is to have several latches on both sides of the panel. This means that, when the lavatory needs to be configured to a combined lavatory configuration, the flight crew has to access both lavatories. Further, there is no means to avoid a passenger from deploying the latches on one side, then the other, and at some point peeking or pushing the wall into the other lavatory's space. A second concern is that the current solution has latches next to the floor, so the flight crew has to reach into the lavatory floor to undo the latches. They are hesitant to do this as the floor of the lavatory may be not clean from time to time.

Disclosed herein is a system and methods for locate the latches of the removable wall in an area that's easier to access, cleaner, and more comfortable to use. In various embodiments, latches are located on the door edge at a location that is accessible from outside the lavatory only when both doors are unlocked, ensuring the movable wall may only be unlatched when no passenger is using either lavatory. Therefore, these systems and methods provide a clear indication of when the wall is unlatched, disabling the use of both lavatories when this happens, as either of these solutions would protrude outside of the convertible wall's volume and would stop the lavatory doors from closing, therefore disabling them.

Referring now to FIG. 1, in accordance with various embodiments, a partial top view of an aircraft cabin with an exemplary lavatory monument is illustrated. In the depicted figure, numerous lavatory monuments 100, 102, 104, 106, and 108 are shown with some located along an outboard wall 105. Lavatory monument 100 is located approximately toward the front of the aircraft, lavatory monument 102 is located approximately in the middle of the fuselage (e.g., near a wing), and lavatory monuments 104, 106, and 108 are located toward the rear of an aircraft 110. The outboard wall 105 may be formed as a curved body of the fuselage of the aircraft 110. The lavatory monuments 104, 106, and 108 are a complex of two adjacent compartments separated by a divider wall. In various embodiments, the lavatory monuments 104, 106, and 108 may be selectively configurable from two separated compartments to a unified private lavatory space by selectively stowing the divider wall to provide a combined and enlarged space for persons with restricted mobility (PRM), or to provide room for an assistant to be in the lavatory space as an aid for the PRM. In various embodiments, the divider wall may be retracted to form the unified space, and then secured in an open position, for example, with floor and/or ceiling locks. In various embodiments, the retracted divider may form a barrier that may conveniently keep the assistant separated from a wet sink area. In various embodiments, the retracted divider may form a barrier that may advantageously protect the sink area from collision or abrasion from a wheelchair, for example.

In the depicted example, an area between the lavatory monuments 104, 106, and 108 and the door is an open area with some extra space for maneuvering, for example, a wheelchair. Note that the drawing is not necessarily shown to scale and is merely illustrative of one possible configuration of the lavatory monuments 100, 102, 104, 106, and 108 in a cabin of the aircraft 110. Configuration of the aisle and seats may be in any suitable arrangement that permits ingress and egress through either of the two doors provided in the lavatory monuments 104, 106, and 108. In various embodiments, the lavatory monument may be located in an aft portion of the aircraft (e.g., near the pressure dome), or in a forward portion of the aircraft (e.g., immediately aft of the cockpit).

In various embodiments, the lavatory monuments 104, 106, and 108, for example, may be designed for lateral installation, with the closed doors of the lavatory monuments 104, 106, and 108 facing forward or aft, depending on configuration in the fuselage. In some examples, the lavatory compartment doors (in the closed position) may be oriented to be parallel to a passenger aisle, such as the center aisle that runs longitudinally from front to aft in a narrow body commercial aircraft.

Figure 2A:
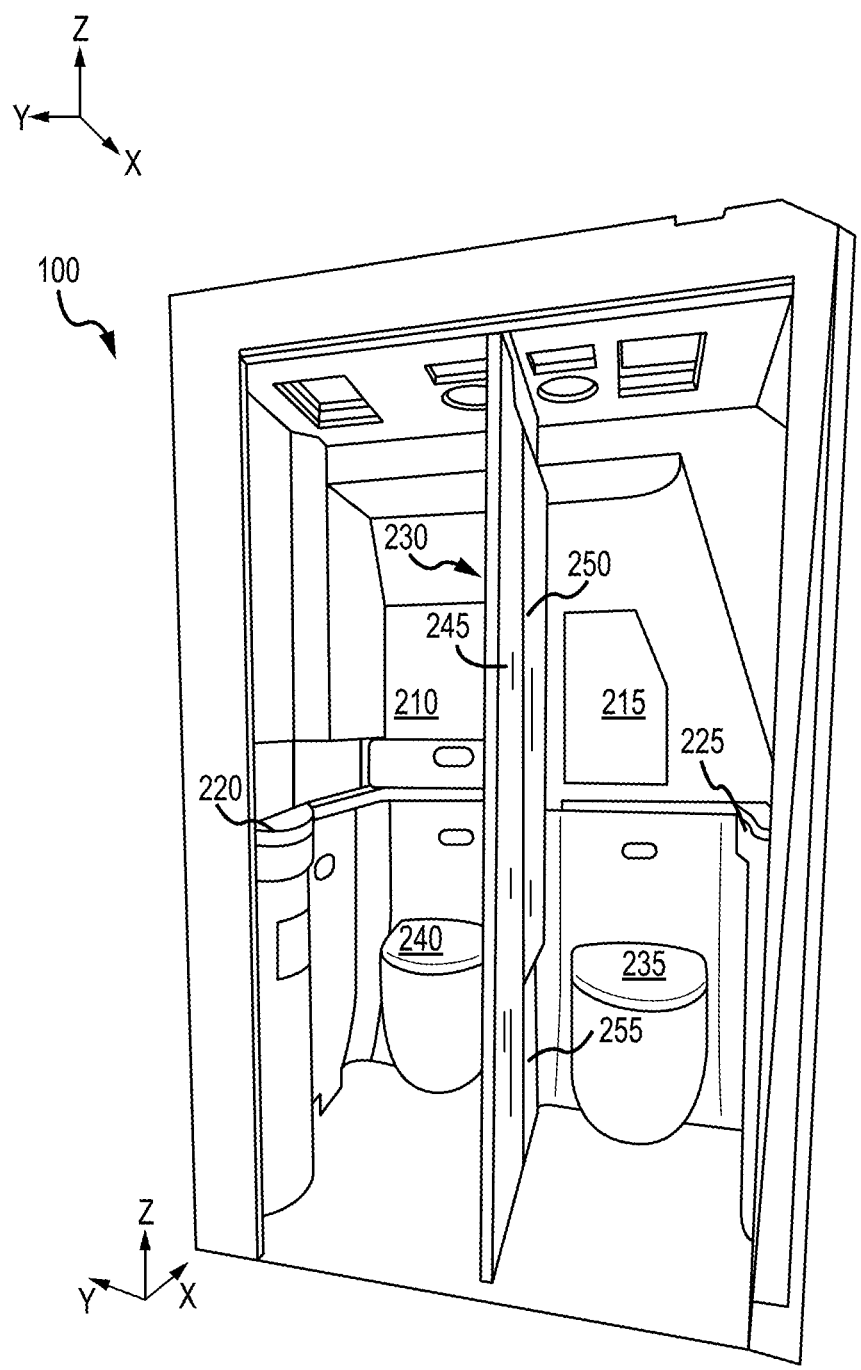
FIG. 2A illustrates an aircraft lavatory monument in a two independent lavatory configuration, in accordance with various embodiments.

Referring now to FIG. 2A, in accordance with various embodiments, the lavatory monument 104, 106, or 108 in a two independent lavatory 210 and 215 configuration is illustrated. Aircraft lavatory 210 includes a toilet 240 and a sink 220. Aircraft lavatory 215 includes a toilet 235 and a sink 225. In a two independent lavatory configuration, movable wall 230 is deployed to divide lavatory 210 from lavatory 215. Movable wall 230 includes front panel 245 with a length from ceiling to floor, a rear panel 250 with a length from ceiling to substantially above a seat cover of toilet 240, and a kickout panel 255 with a length from the bottom of the rear panel 250 to the floor.

Figure 2B:
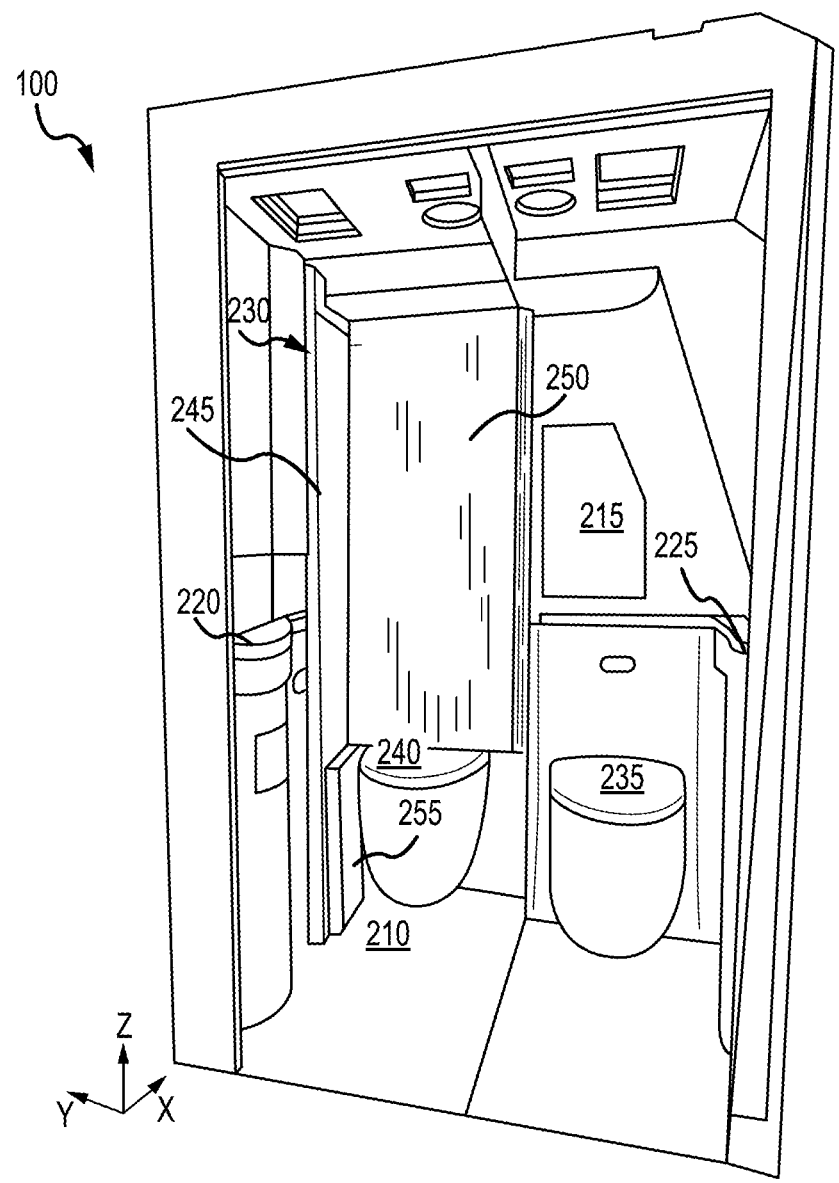
FIG. 2B illustrates an aircraft lavatory monument in a combined lavatory configuration, in accordance with various embodiments.

Referring now to FIG. 2B, in accordance with various embodiments, the lavatory monument 104, 106, or 108 in a combined lavatory configuration is illustrated. Aircraft lavatory 210 includes a toilet 240 and a sink 220. Aircraft lavatory 215 includes a toilet 235 and a sink 225. In the combined lavatory configuration, movable wall 230 is folded such the kickout panel 255 rotates about a first hinge coupled to the front panel 245 to be adjacent to the front panel 245, the rear panel 250 articulates about a second hinge coupled to the outer wall of the lavatory monument 104, 106, or 108 allowing the rear panel 250 to be displaced against the outer wall of the lavatory monument 104, 106, or 108 in aircraft lavatory 210, and the front panel 245 articulates about a third hinge coupled to the rear panel 250 allowing the front panel 245 be displaced against the sink side wall of the aircraft lavatory 210.

Figure 3A:
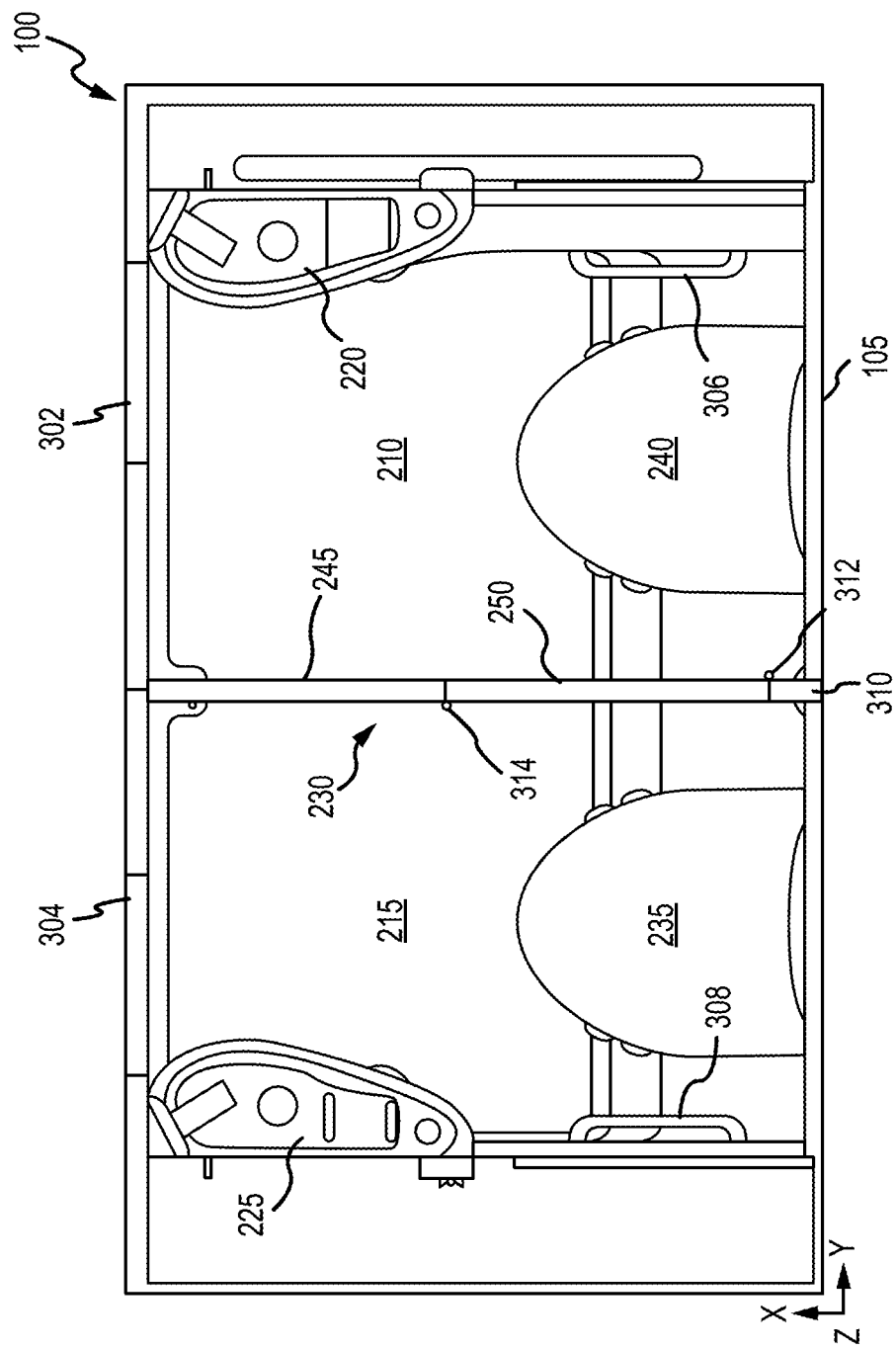
FIG. 3A illustrates a top view of a lavatory monument in the having a movable wall in a closed position, in accordance with various embodiments

Referring now to FIG. 3A, in accordance with various embodiments, a top view of a lavatory monument 104, 106, or 108 in a first configuration is illustrated. Lavatories 210, 215 have a "mirror image" arrangement of a sink 220 and a sink 225, respectively, toilet 240 and toilet 235, respectively, stability bars 306 and 308, respectively, which are mounted for use as support in lavatories 210 and 215. Lavatories 210 and 215 are separated by a movable wall 230 that provides privacy between a toilet 235 in the lavatory 215 and a toilet 240 in the lavatory 210. Lavatory 210 and lavatory 215 are substantially similar and a substantial mirror image of each other when configured as divided by the movable wall 230 into two separate compartments. In various embodiments, the movable wall 230 is in a closed (or first) position. When the movable wall 230 is closed (which may also be referred to herein as the first configuration), the movable wall 230 allows independent access to lavatory 210 via bifold door 302 and lavatory 215 via bifold door 304.

As will be described in further detail with reference to FIG. 3B, the movable wall 230 includes front panel 245 and rear panel 250. Toilet 240 is located against the outer wall approximately at a center of the lavatory 210. Sink 220 is connected to a water supply and sewage system. Lavatory 210 is also connected to electrical and environmental utilities. In a retrofit application, the layout of lavatory 210 preferably matches that of a previously installed lavatory complex such that the utilities can be connected without substantial rework or relocation of the utilities. Lavatory 210 provides a first space for a person to move inside lavatory 210. The first space has a limited size and dimension constrained by bifold door 302, the movable wall 230, sink 220, and toilet 240. Accordingly, lavatory 210 has, in the various embodiments, enough room for only one person to move about in a comfortable manner. Furthermore, if a person with reduced mobility (e.g., disabled, elderly, injured, etc.) enters lavatory 210, then an assistant. i.e., a second person, may not have sufficient space to assist the person on to toilet 240. Further, if the first person requires a wheelchair, there may be no room to accept the wheelchair within lavatory 210.

Similarly, lavatory 215 includes toilet 235 and sink 225. Toilet 235 is located against the outer wall approximately at a center. Furthermore, lavatory 215 also includes a second space, similar to the first space. Lavatory 215 is, in various embodiments, substantially a mirror image of lavatory 210. In a retrofit application, the layout of lavatory 210 and 215 preferably matches that of a previously installed lavatory complex such that the utilities can be connected without substantial rework or relocation of the utilities. In FIG. 3A, the movable wall 230 is in closed (or first) position. In various embodiments, front panel 245 and rear panel 250 are aligned with frame segment 310. In various embodiments, rear panel 250 is hingedly coupled to the frame segment 310 via hinge 312, while front panel 245 is hingedly coupled to rear panel 250 via hinge 314.

Figure 3B:
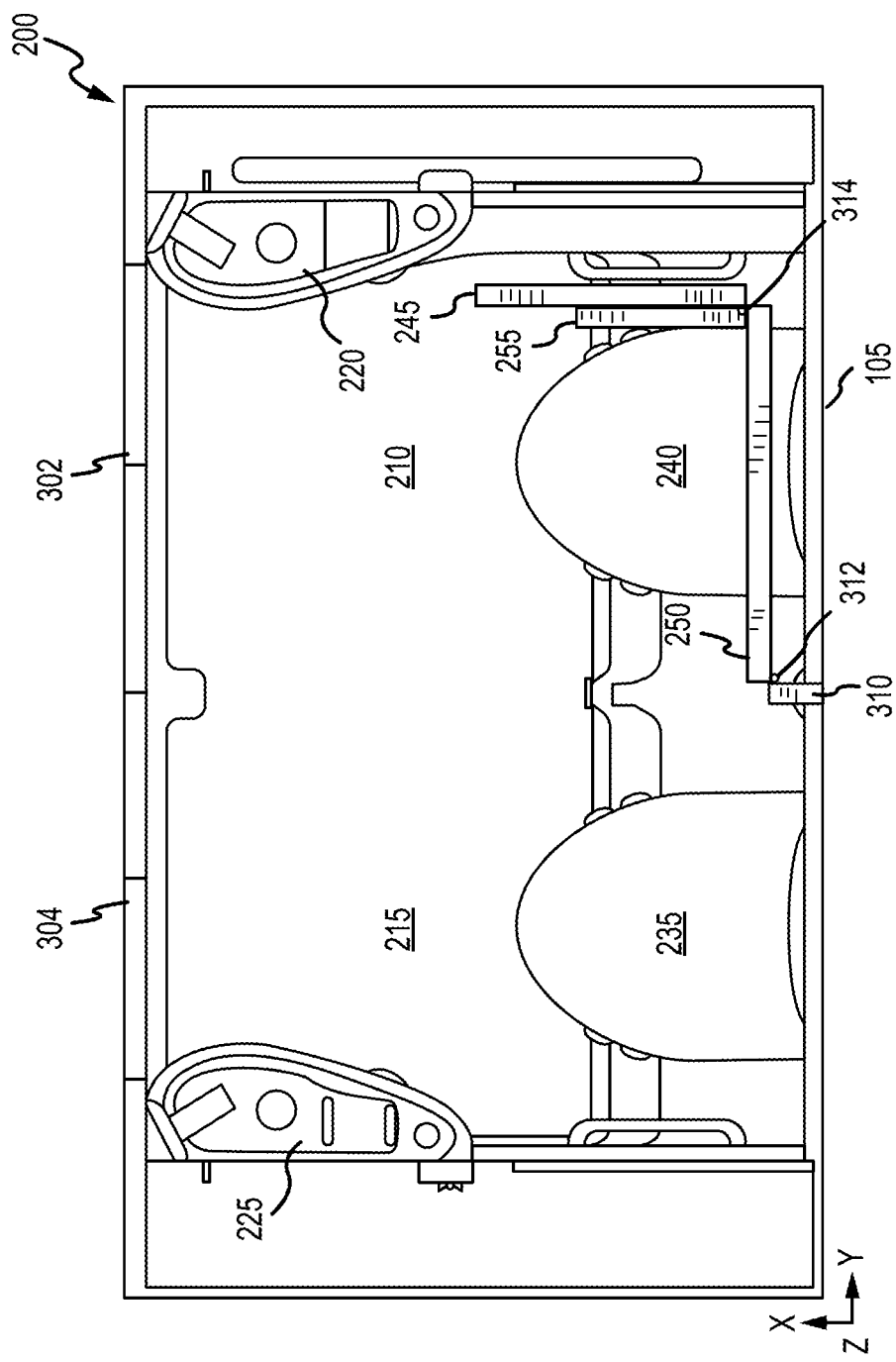
FIG. 3B illustrates a top view of the lavatory monument of FIG. 3A with the wall in a fully open position, in accordance with various embodiments.

Referring now to FIG. 3B, in accordance with an illustrative embodiment, a top view of a lavatory monument 104, 106, or 108 in a second configuration is illustrated. In FIG. 3B, once unlocked, front panel 245 and rear panel 250 may rotate simultaneously, i.e., about the z-axis. The front panel 245 and/or the rear panel 250 may be pushed causing the rear panel 250 to rotate, i.e., about the z-axis in a clockwise direction, about a hinge 312 that hingedly couples to frame segment 310 allowing the rear panel 250 be displaced against the outer wall of the lavatory monument 104, 106, or 108 in aircraft lavatory 210. Simultaneously, the front panel 245 rotates, i.e., about the z-axis in a counterclockwise direction, about hinge 314 that hingedly couples the rear panel 250 to the front panel 245. When rotated, the front panel is displaced against the sink side wall of lavatory 210. While not shown in FIG. 3A, the kickout panel 255 rotates, i.e., about the z-axis in a counterclockwise direction, about a hinge that hingedly couples to the front panel 245 such that the kickout panel moves to a position that is adjacent to the front panel 245.

Figure 4:
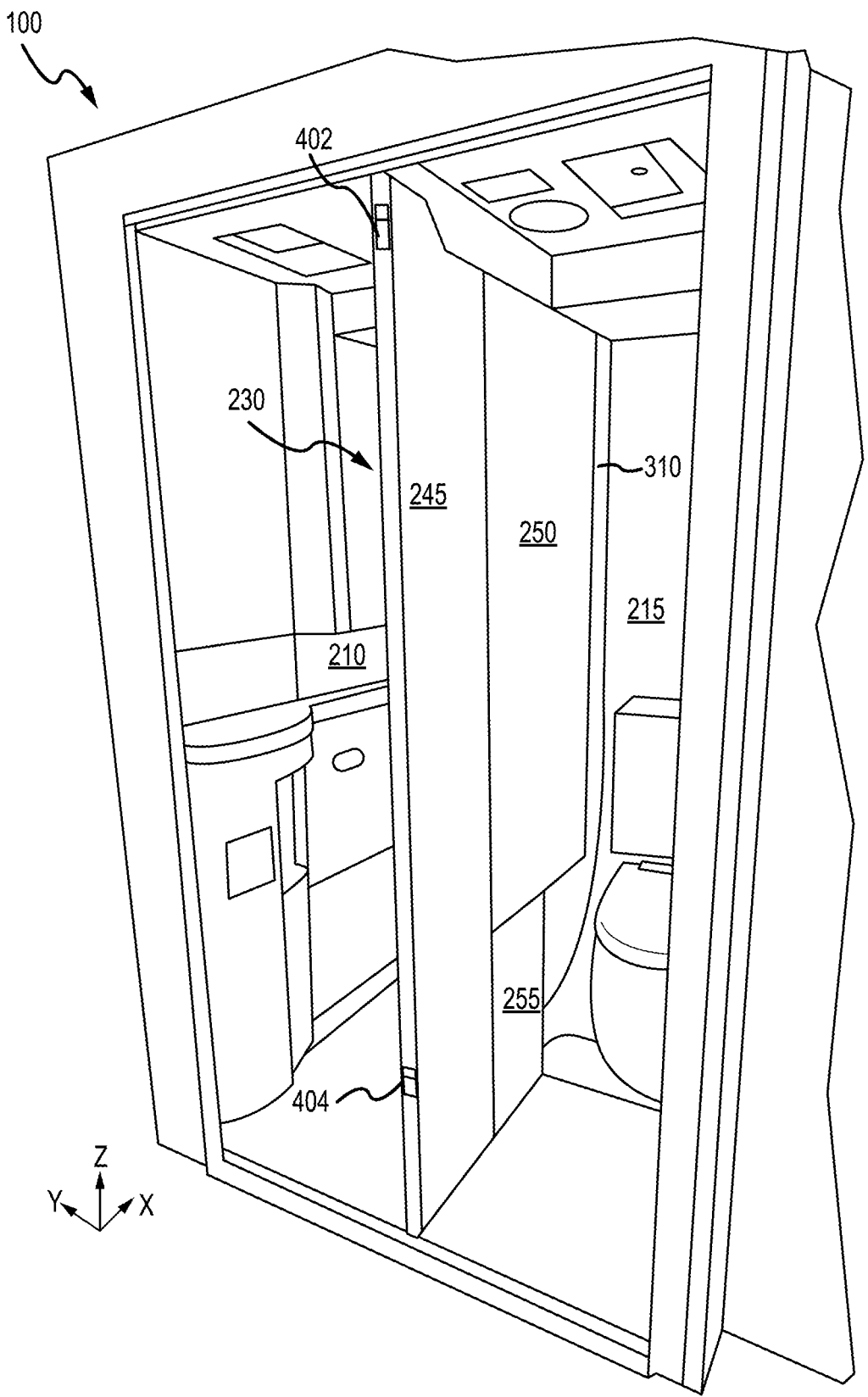
FIG. 4 illustrates a mechanism for locking/unlocking a movable wall of a lavatory monument without entering either of the lavatories, in accordance with various embodiments.

Referring now to FIG. 4, in accordance with an illustrative embodiment, a mechanism for locking/unlocking a movable wall 230 of a lavatory monument 104, 106, or 108 without entering either of the lavatories is illustrated. In various embodiments, front panel 245 of movable wall 230 includes one or more latching mechanisms 402 and 404. In various embodiments, each of latching mechanisms 402 and 404 are located on an outer edge of the front panel 245 that is accessible from outside lavatories 210 and 215 only when both doors are unlocked, ensuring the movable wall 230 may only be unlatched when no passenger is using either of lavatories 210 or 215. In various embodiments, latching mechanisms 402 and 404 are configured such that, in response to either or both of latching mechanisms 402 and 404 being in an unlocked configuration, neither of the doors, such as bifold doors 302 and 304 of FIG. 3A, may be closed therefore disabling lavatories 210 and 215.

Figure 5B:
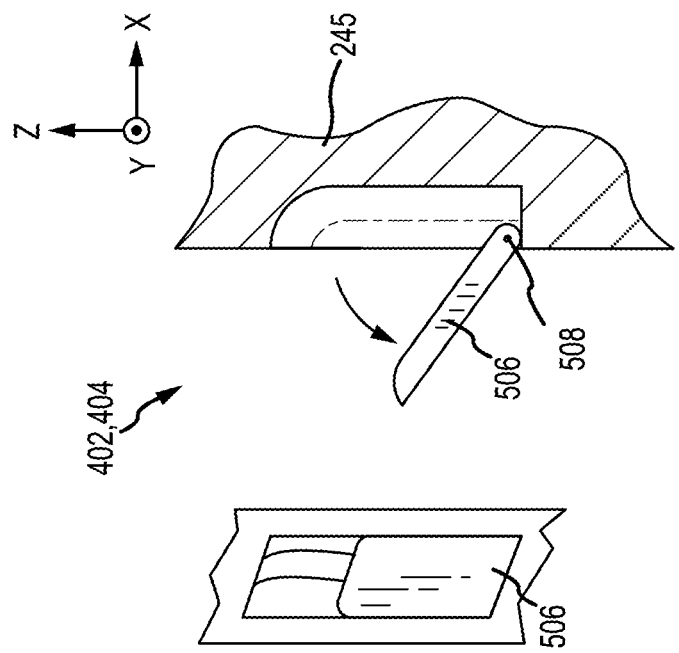
FIGS. 5A and 5B illustrate how latching mechanisms on a movable wall of a lavatory monument may disable lavatories, in accordance with various embodiments.
Figure 5A:
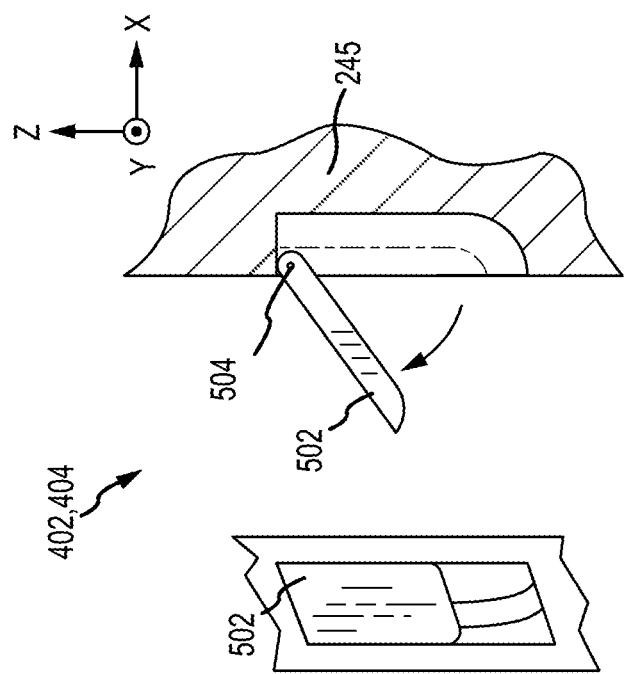

Referring now to FIGS. 5A and 5B, in accordance with various embodiments, examples of how latching mechanisms 402 and 404 on movable wall 230 of a lavatory monument 104, 106, or 108 may disable lavatories 210 and 215 is illustrated. With regard to FIG. 5A, in various embodiments, release handle 502 may be disposed in an outer edge of front panel 245 and may be configured to, once articulated, to release the front panel 245 from the rear panel 250 and/or the kickout panel 255. In various embodiments, the release handle 502 is pivotably coupled to the front panel 245 via shaft 504 that extends laterally in a y-direction. In various embodiments, rotation of release handle 502 about shaft 504 in a clockwise direction causes release handle 502 to protrude from the outer edge of the front panel 245, providing a blocking mechanism that prevents either of the bifold doors 302 and 304 of FIG. 3A to the lavatories from closing thereby disabling lavatories 210 and 215.

Similarly, with regard to FIG. 5B, in various embodiments, release handle 506 may be disposed in an outer edge of front panel 245 and may be configured to, once articulated, to release the front panel 245 from the rear panel 250 and/or the kickout panel 255. In various embodiments, the release handle 506 is pivotably coupled to the front panel 245 via shaft 508 that extends laterally in a y-direction. In various embodiments, rotation of release handle 506 about shaft 508 in a counterclockwise direction causes release handle 506 to protrude from the outer edge of the front panel 245, providing a blocking mechanism that prevents either of the bifold doors 302 and 304 of FIG. 3A to the lavatories from closing thereby disabling lavatories 210 and 215.

Figure 6:
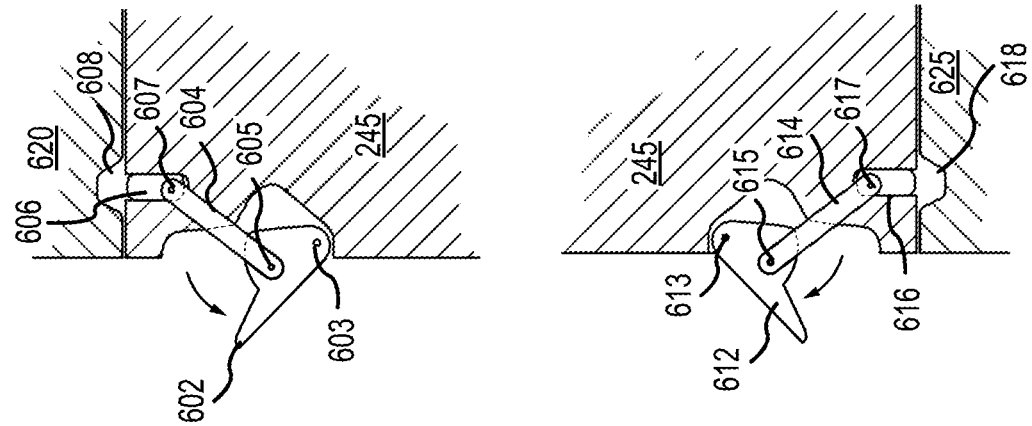
FIG. 6 illustrates latching mechanisms on a movable wall of a lavatory monument, in accordance with various embodiments.
Figure 6:
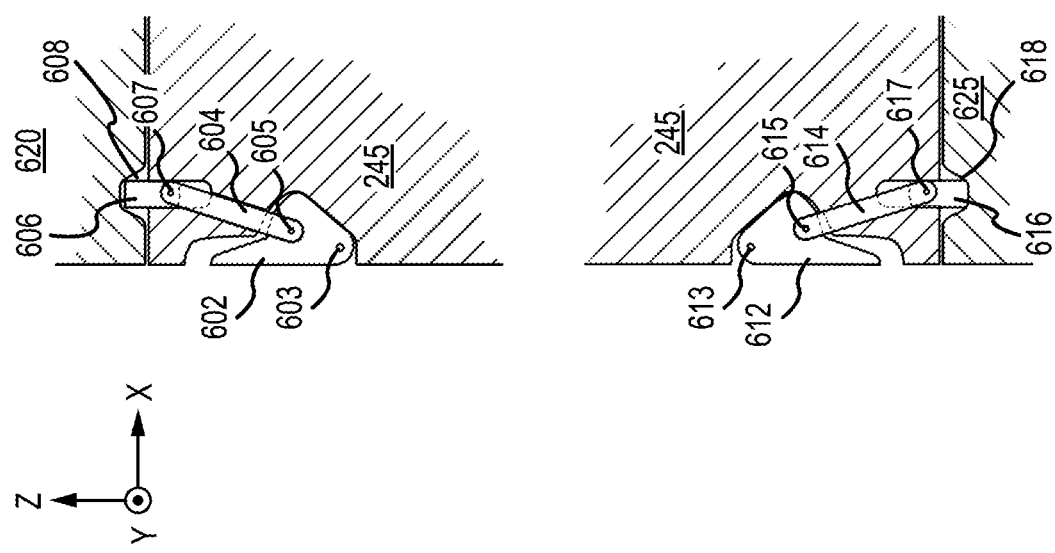

Referring now to FIG. 6, in accordance with various embodiments, latching mechanisms on movable wall 230 of a lavatory monument 104, 106, or 108 is illustrated. In various embodiments, handle 602, which may be part of a latching mechanism such as latching mechanism 402 of FIG. 4, is pivotably coupled to the front panel 245 via shaft 603 that extends laterally in a y-direction. In various embodiments, a first end of linking mechanism 604 is pivotably coupled to handle 602 via shaft 605 that extends laterally in a y-direction and a second end of linking mechanism 604 is pivotably coupled to pin 606 via shaft 607 that extends laterally in a y-direction. In various embodiments, in a locked position, pin 606 is forced upward, i.e., in a positive z-direction, by linking mechanism 604 such that pin 606 engages with a slot 608 in the ceiling 620 of the aircraft. In various embodiments, to move to an unlocked position, handle 602 is rotated about shaft 603 in a counterclockwise direction, which causes the first end of the linking mechanism 604 to traverse outward, i.e., in a negative x-direction, moving the second end of the linking mechanism 604 downward, i.e., in a negative z-direction. By the second end of the linking mechanism 604 moving downward, pin 606 is forced downward, i.e., in a negative z-direction, such that pin 606 disengages with a slot 608 in the ceiling 620 of the aircraft.

In various embodiments, handle 612, which may be part of a latching mechanism such as latching mechanism 404 of FIG. 4, is pivotably coupled to the front panel 245 via shaft 613 that extends laterally in a y-direction. In various embodiments, a first end of linking mechanism 614 is pivotably coupled to handle 612 via shaft 615 that extends laterally in a y-direction and a second end of linking mechanism 614 is pivotably coupled to pin 616 via shaft 617 that extends laterally in a y-direction. In various embodiments, in a locked position, pin 616 is forced downward, i.e., in a negative z-direction, by linking mechanism 614 such that pin 616 engages with a slot 618 in the floor 625 of the aircraft. In various embodiments, to move to an unlocked position, handle 612 is rotated about shaft 613 in a clockwise direction, which causes the first end of the linking mechanism 614 to traverse outward. i.e., in a negative x-direction, moving the second end of the linking mechanism 614 upward. i.e., in a positive z-direction. By the second end of the linking mechanism 614 moving upward, pin 616 is forced upward, i.e., in a positive z-direction, such that pin 616 disengages with a slot 618 in the floor 625 of the aircraft.

Figure 7:
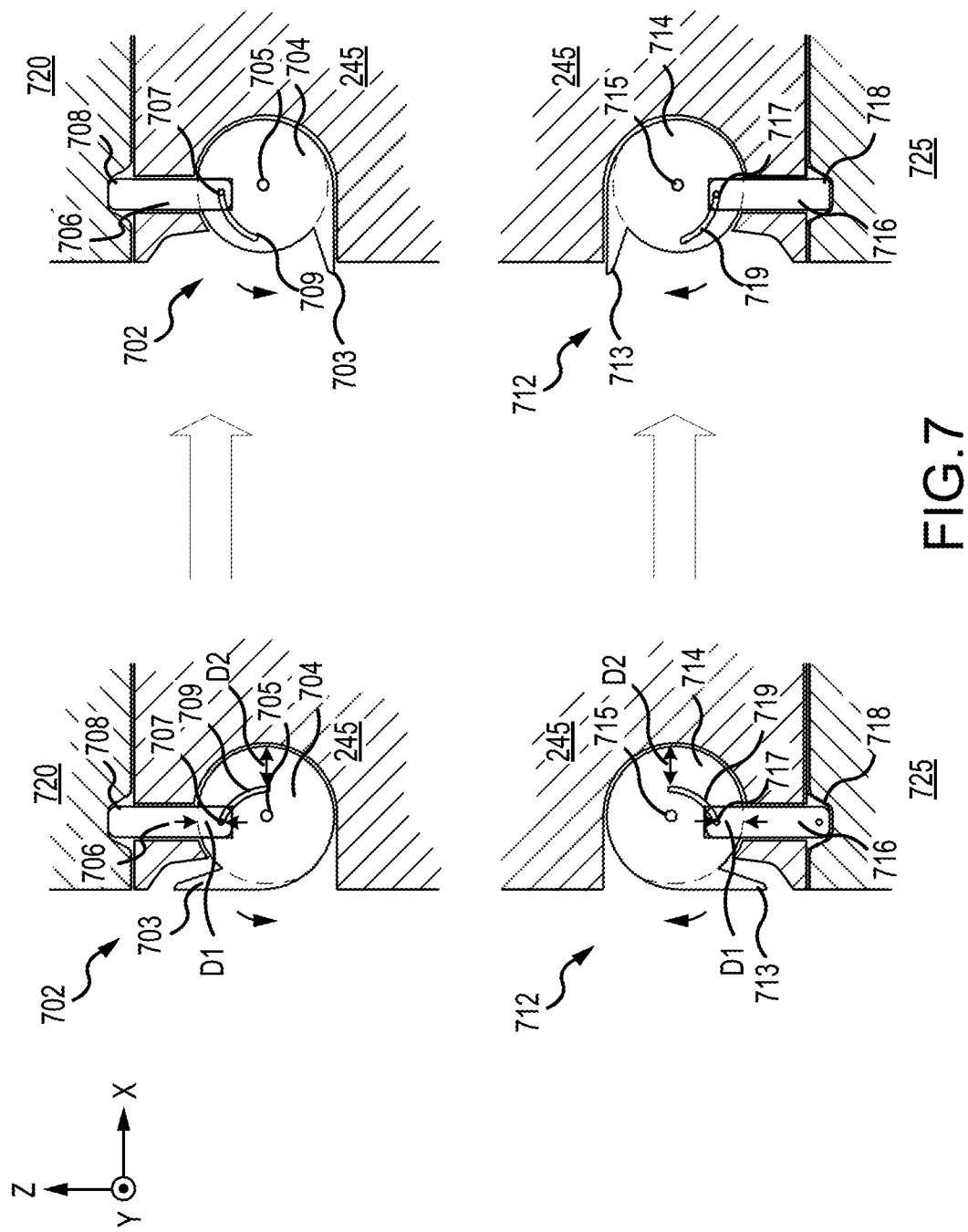
FIG. 7 illustrates latching mechanisms on a movable wall of a lavatory monument, in accordance with various embodiments.

Referring now to FIG. 7, in accordance with an illustrative embodiment, latching mechanisms on movable wall 230 of a lavatory monument 104, 106, or 108 is illustrated. In various embodiments, latching mechanism 702, which may be part of a latching mechanism such as latching mechanism 402 of FIG. 4, includes a handle portion 703 coupled to a circular portion 704. The circular portion 704 is pivotably coupled to the front panel 245 via shaft 705 that extends laterally in a y-direction. In various embodiments, pin 706 is pivotably coupled to the circular portion 704 via shaft 707 that extends laterally in a y-direction. In various embodiments, shaft 707 traverses a slot 709 that is a first dimension D1 away from an outer diameter of the circular portion 704 at a first end and is a second dimension D2 away from the outer diameter of the circular portion 704 at a second end opposite the first end. In various embodiments, as shaft 707 traverses slot 709, when the handle portion 703 is rotated in a counterclockwise direction thereby forcing the circular portion 704 to rotate in an counterclockwise direction, pin 706 is forced downward, i.e., in a negative z-direction. Therefore, in various embodiments, in a locked position, pin 706 is forced upward, i.e., in a positive z-direction such that pin 706 engages with a slot 708 in the ceiling 720 of the aircraft. In various embodiments, to move to an unlocked position, handle portion 703 is rotated in a counterclockwise direction thereby forcing the circular portion 704 to rotate in a counterclockwise direction, which causes shaft 707 to traverse the slot 709 in a clockwise direction. In various embodiments, as shaft 707 traverses slot 709 in the clockwise direction, when the handle portion 703 is rotated in a counterclockwise direction thereby forcing the circular portion 704 to rotate in an counterclockwise direction, pin 706 is forced downward, i.e., in a negative z-direction, such that pin 706 disengages with a slot 708 in the ceiling 720 of the aircraft.

In various embodiments, latching mechanism 712, which may be part of a latching mechanism such as latching mechanism 404 of FIG. 4, includes a handle portion 713 coupled to a circular portion 714. The circular portion 714 is pivotably coupled to the front panel 245 via shaft 715 that extends laterally in a y-direction. In various embodiments, pin 716 is pivotably coupled to the circular portion 714 via shaft 717 that extends laterally in a y-direction. In various embodiments, shaft 717 traverses a slot 719 that is a first dimension D1 away from an outer diameter of the circular portion 714 at a first end and is a second dimension D2 away from the outer diameter of the circular portion 714 at a second end opposite the first end. In various embodiments, as shaft 717 traverses slot 719, when the handle portion 713 is rotated in a clockwise direction thereby forcing the circular portion 714 to rotate in an clockwise direction, pin 716 is forced upward, i.e., in a positive z-direction. Therefore, in various embodiments, in a locked position, pin 716 is forced downward, i.e., in a negative z-direction such that pin 716 engages with a slot 718 in the floor 725 of the aircraft. In various embodiments, to move to an unlocked position, handle portion 713 is rotated in a clockwise direction thereby forcing the circular portion 714 to rotate in a clockwise direction, which causes shaft 717 to traverse the slot 719 in a counterclockwise direction. In various embodiments, as shaft 717 traverses slot 719 in the counterclockwise direction, when the handle portion 713 is rotated in a clockwise direction thereby forcing the circular portion 714 to rotate in an clockwise direction, pin 716 is forced upward, i.e., in a positive z-direction, such that pin 716 disengages with a slot 718 in the floor 525 of the aircraft.

Figure 8:
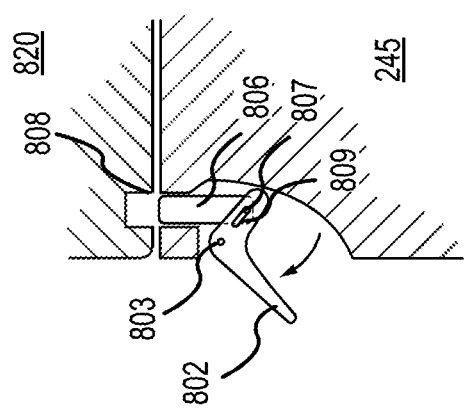
FIG. 8 illustrates latching mechanisms on a movable wall of a lavatory monument, in accordance with various embodiments.
Figure 8:
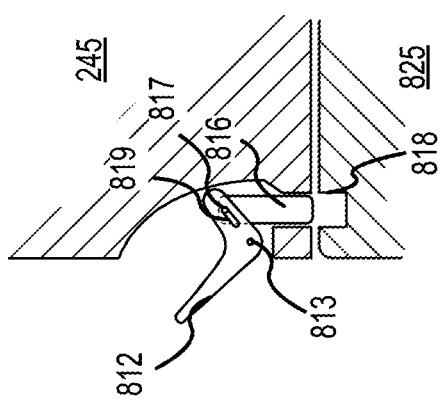
Figure 8:
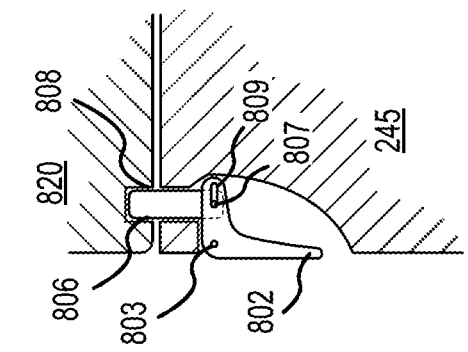
Figure 8:
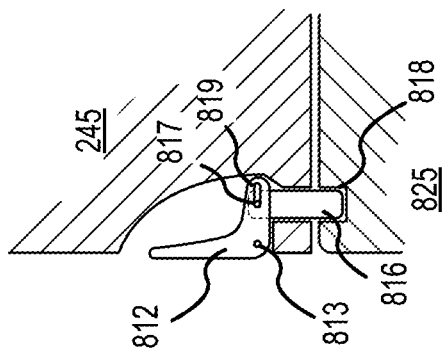
Figure 8:
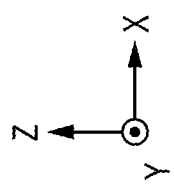

Referring now to FIG. 8, in accordance with various embodiments, latching mechanisms on movable wall 230 of a lavatory monument 104, 106, or 108 is illustrated. In various embodiments, handle 802, which may be part of a latching mechanism such as latching mechanism 402 of FIG. 4, includes a first portion that extends in a first direction, i.e., in a z-direction, and a second portion that extends in a second direction, i.e., in an x-direction, that is perpendicular to the first portion. In various embodiments, handle 802 is pivotably coupled to the front panel 245 via shaft 803 that extends laterally in a y-direction. In various embodiments, pin 806 is pivotably coupled to handle 802 via shaft 807 that extends laterally in a y-direction. In various embodiments, shaft 807 traverses a slot 809 incorporated into the second portion of the handle 802 and extends along a length of the handle 802 in a first direction, i.e., in an x-direction. In various embodiments, in a locked position, pin 806 is forced upward, i.e., in a positive z-direction, such that pin 806 engages with a slot 808 in the ceiling 820 of the aircraft. In various embodiments, to move to an unlocked position, handle 802 is rotated about shaft 803 in a clockwise direction, which causes shaft 807 to traverse slot 809 in the first direction, i.e., in a positive x-direction, thereby forcing the pin 806 downward, i.e., in a negative z-direction, such that pin 806 disengages with a slot 808 in the ceiling 820 of the aircraft.

In various embodiments, handle 812, which may be part of a latching mechanism such as latching mechanism 404 of FIG. 4, includes a first portion that extends in a first direction, i.e., in a z-direction, and a second portion that extends in a second direction, i.e., in an x-direction, that is perpendicular to the first portion. In various embodiments, handle 812 is pivotably coupled to the front panel 245 via shaft 813 that extends laterally in a y-direction. In various embodiments, pin 816 is pivotably coupled to handle 812 via shaft 817 that extends laterally in a y-direction. In various embodiments, shaft 817 traverses a slot 819 incorporated into the second portion of the handle 812 and extends along a length of the handle 812 in a first direction, i.e., in an x-direction. In various embodiments, in a locked position, pin 816 is forced downward, i.e., in a negative z-direction, such that pin 816 engages with a slot 818 in the floor 825 of the aircraft. In various embodiments, to move to an unlocked position, handle 812 is rotated about shaft 813 in a counterclockwise direction, which causes shaft 817 to traverse slot 819 in the first direction, i.e., in a positive x-direction, thereby forcing the pin 816 upward, i.e., in a positive z-direction, such that pin 816 disengages with a slot 818 in the floor 825 of the aircraft.

Figure 9:
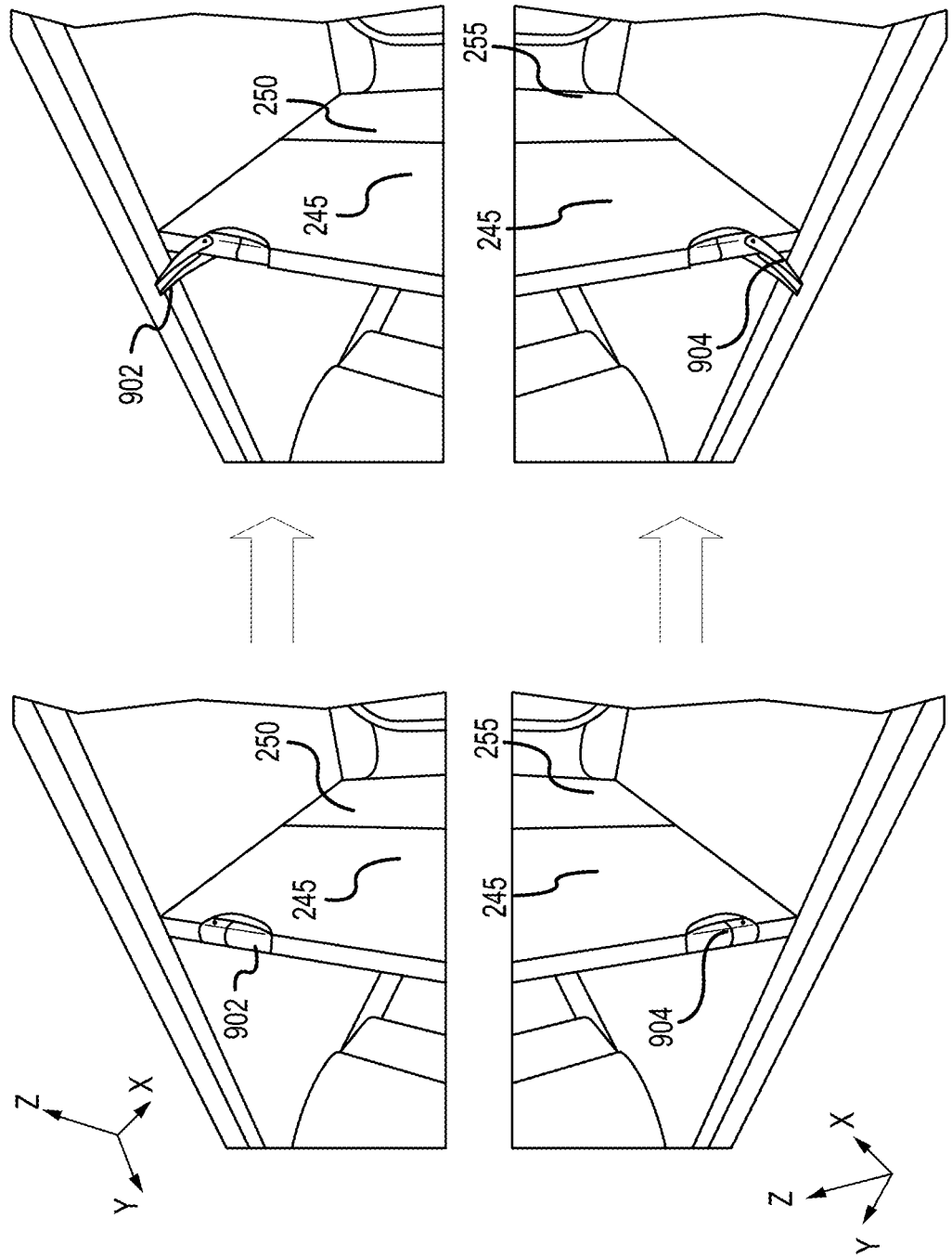
FIG. 9 illustrates a hollow handle for use on a movable wall of a lavatory monument, in accordance with various embodiments.

Referring now to FIG. 9, in accordance with various embodiments, a hollow handle for use on a movable wall 230 of a lavatory monument 104, 106, or 108 is illustrated. While in some of the embodiments shown previously the handle has been depicted as substantially solid, in other various embodiments, the handle may be substantially hollow. In the depicted example, handles 902 and 904 include a first side portion and a second side portion such that the first side portion is coupled to the second side portion via a face portion. Handles 902 and 904 are configured such that, in a locked position, the first side portion is in contact with a first side of the front panel 245, the second side portion is in contact with a second side of the front panel 245, and the face portion is in contact with the outer edge of the front panel 245. It is noted that handles 902 and 904 may be coupled to the various latching mechanism via a shaft, such as shaft 603 or 613 of FIG. 6.

Figure 10C:
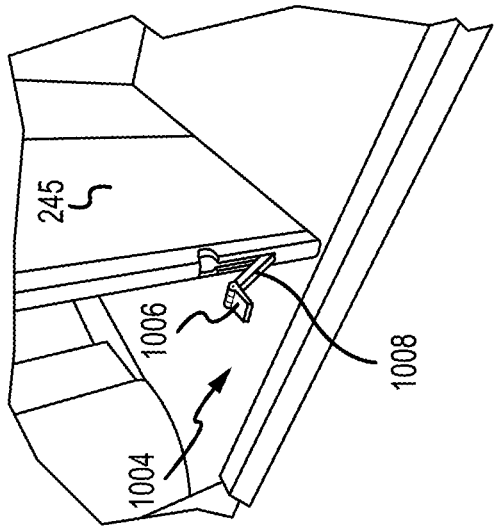
FIGS. 10A, 10B, and 10C illustrate a foot lever mechanism for use on a movable wall of a lavatory monument, in accordance with various embodiments.
Figure 10B:
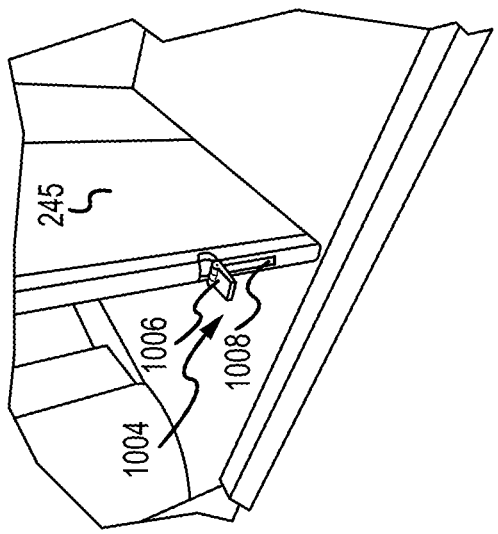
Figure 10A:
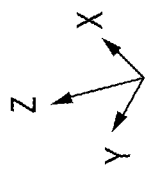
Figure 10A:
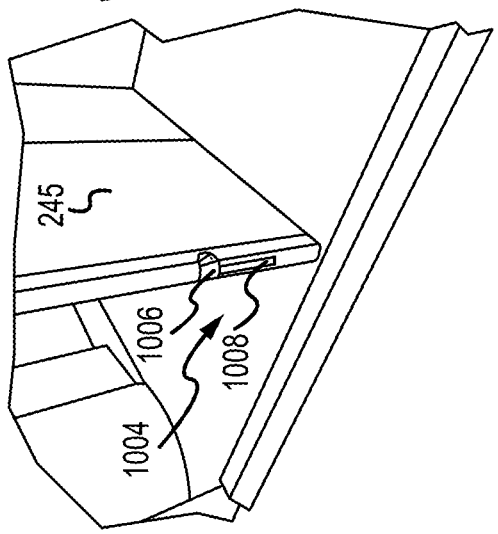

Referring now to FIGS. 10A-10C, in accordance with various embodiments, a foot lever mechanism for use on a movable wall 230 of a lavatory monument 104, 106, or 108 is illustrated. Foot lever mechanism 1004 includes a tab portion 1006 and a bolt portion 1008. In various embodiments, to move foot lever mechanism 1004 to an unlocked position, the tab portion 1006 is rotated in a counterclockwise position which causes a lower end portion of the tab portion 1006 to abut a face of the bolt portion 1008. In response to a user then forcing the tab portion 1006 further in a negative z-direction, the bolt portion 1008 rotates about a shaft, such as shaft 813 of FIG. 8, in a counterclockwise direction, which is coupled to a pin, such as pin 816 of FIG. 8, thereby forcing the pin upward, i.e., in a positive z-direction, such that the pin disengages with a slot in the floor of the aircraft.

Figure 11B:
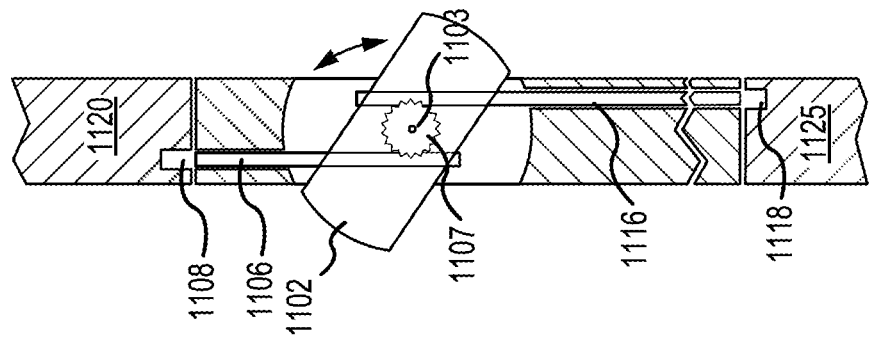
Figure 11B:
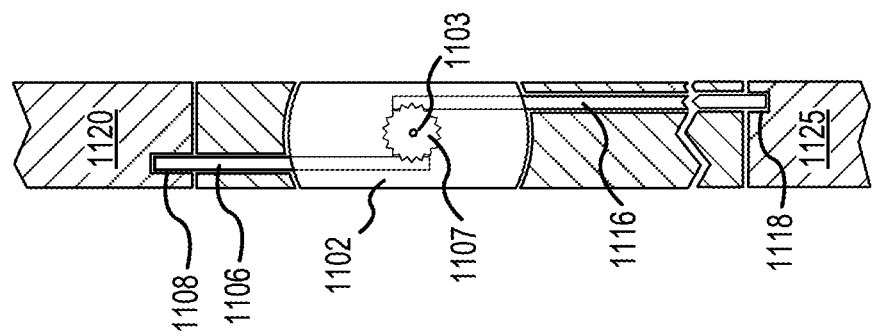

Referring now to FIGS. 11A and 11B, in accordance with an illustrative embodiment, latching mechanisms on movable wall 230 of a lavatory monument 104, 106, or 108 is illustrated. In various embodiments, handle 1102 is pivotably coupled to the front panel 245 via shaft 1103 that extends laterally in an x-direction into the front panel 245. In various embodiments, handle 1102 is configured to rotate in a counterclockwise direction to unlock the front panel 245. In various embodiments, handle 1102 may be configured to rotate in a clockwise direction to unlock the front panel 245. In various embodiments, shaft 1103 is coupled to a gear mechanism 1107 that engages with an upper pin 1106 and lower pin 1116. In various embodiments, in a locked position, the upper pin 1106 is forced upward, i.e., in a positive z-direction, such that the upper pin 1106 engages with a slot 1108 in the ceiling 1120 of the aircraft. Simultaneously, in various embodiments, in a locked position, the lower pin 1116 is forced downward, i.e., in a negative z-direction, such that the lower pin 1116 engages with a slot 1118 in the floor 1125 of the aircraft.

In various embodiments, to move to an unlocked position, handle 1102 is rotated in a counterclockwise direction, which causes shaft 1103 to rotate in a counterclockwise direction thereby rotating the gear mechanism 1107 in a counterclockwise direction. In various embodiments, by the gear mechanism 1107 rotating in the counterclockwise direction, the upper pin 1106 is forced downward, i.e., in a negative z-direction, such that the upper pin 1106 disengages with a slot 1108 in the ceiling 1120 of the aircraft. Simultaneously, in various embodiments, by the gear mechanism 1107 rotating in the counterclockwise direction, the lower pin 1116 is forced upward, i.e., in a positive z-direction, such that the lower pin 1116 disengages with a slot 1118 in the floor 1125 of the aircraft.

Figure 12A:
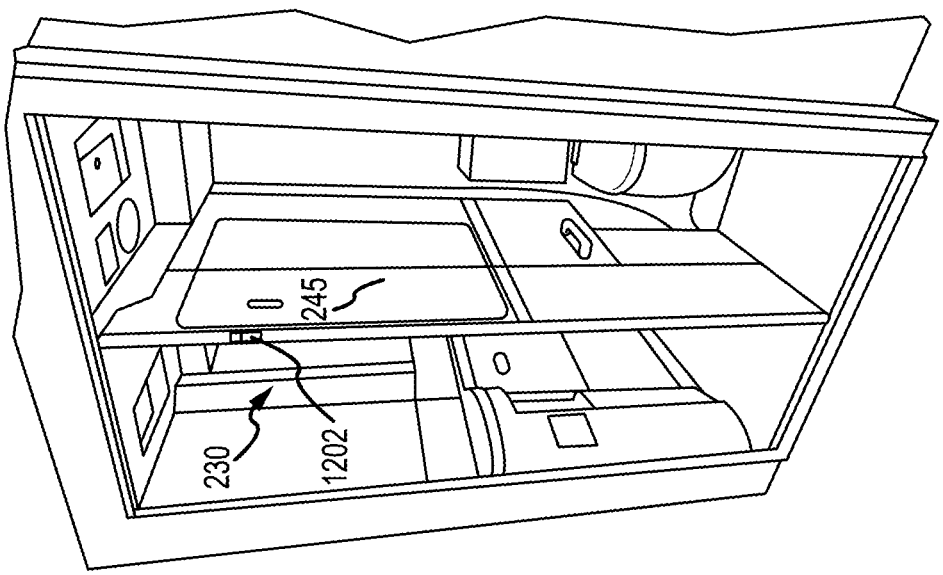
FIGS. 12A and 12B illustrate latching mechanisms on a movable wall of a lavatory monument, in accordance with various embodiments.
Figure 12A:
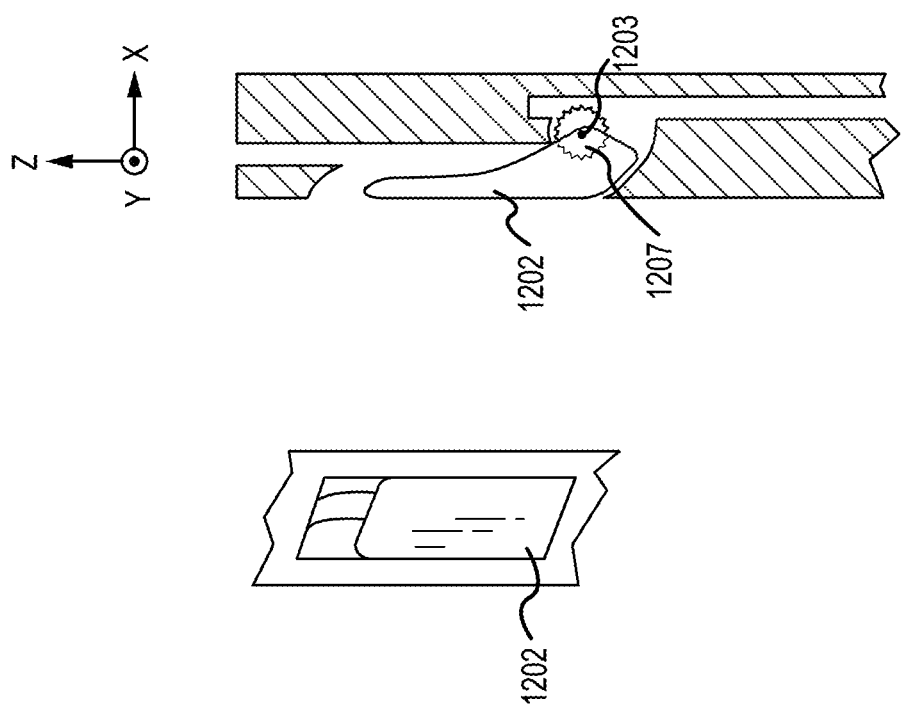
Figure 12B:
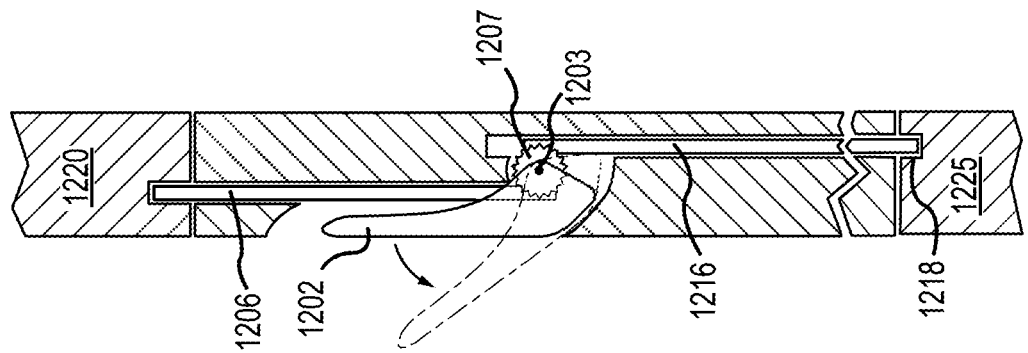
Figure 12B:
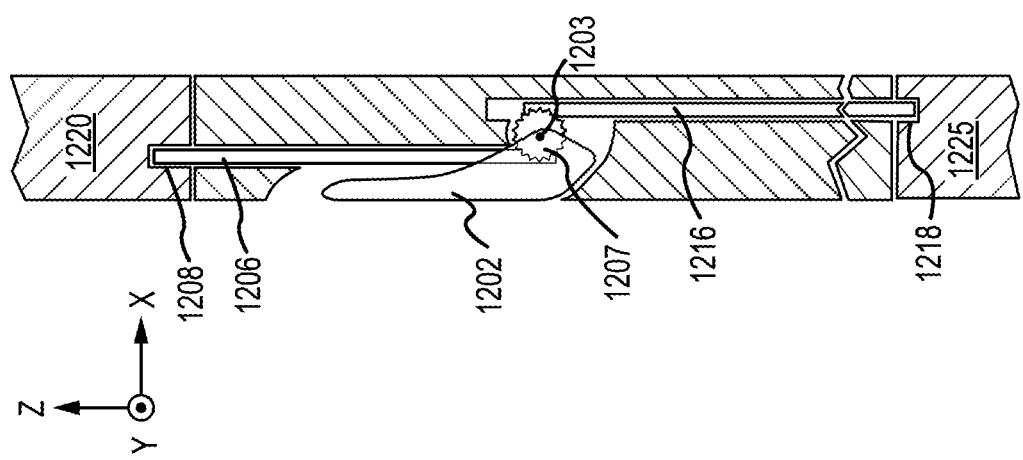

Referring now to FIGS. 12A and 12B, in accordance with an illustrative embodiment, latching mechanisms on movable wall 230 of a lavatory monument 104, 106, or 108 is illustrated. In various embodiments, handle 1202 is pivotably coupled to the front panel 245 via shaft 1203 that extends laterally in an y-direction. In various embodiments, handle 1202 is configured to rotate in a counterclockwise direction to unlock the front panel 245. In various embodiments, shaft 1203 is coupled to a gear mechanism 1207 that engages with an upper pin 1206 and lower pin 1216. In various embodiments, in a locked position, the upper pin 1206 is forced upward, i.e., in a positive z-direction, such that the upper pin 1206 engages with a slot 1208 in the ceiling 1220 of the aircraft. Simultaneously, in various embodiments, in a locked position, the lower pin 1216 is forced downward, i.e., in a negative z-direction, such that the lower pin 1216 engages with a slot 1218 in the floor 1225 of the aircraft.

In various embodiments, to move to an unlocked position, handle 1202 is rotated in a counterclockwise direction, which causes shaft 1203 to rotate in a counterclockwise direction thereby rotating the gear mechanism 1207 in a counterclockwise direction. In various embodiments, by the gear mechanism 1207 rotating in the counterclockwise direction, the upper pin 1206 is forced downward, i.e., in a negative z-direction, such that the upper pin 1206 disengages with a slot 1208 in the ceiling 1220 of the aircraft. Simultaneously, in various embodiments, by gear mechanism 1207 rotating in the counterclockwise direction, the lower pin 1216 is forced upward, i.e., in a positive z-direction, such that the lower pin 1216 disengages with a slot 1218 in the floor 1225 of the aircraft.

Figure 13:
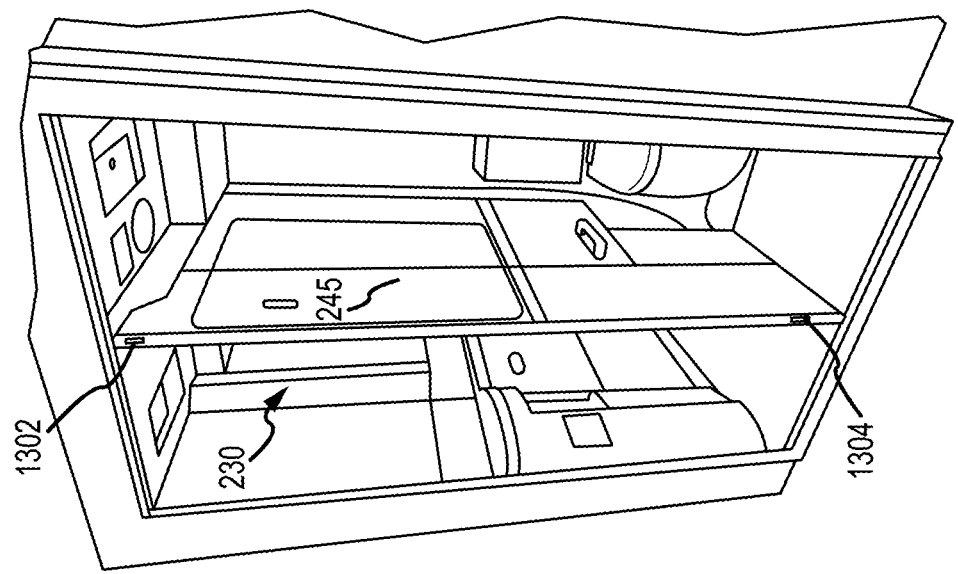
FIG. 13 illustrates latching mechanisms on a movable wall of a lavatory monument, in accordance with various embodiments.
Figure 13:
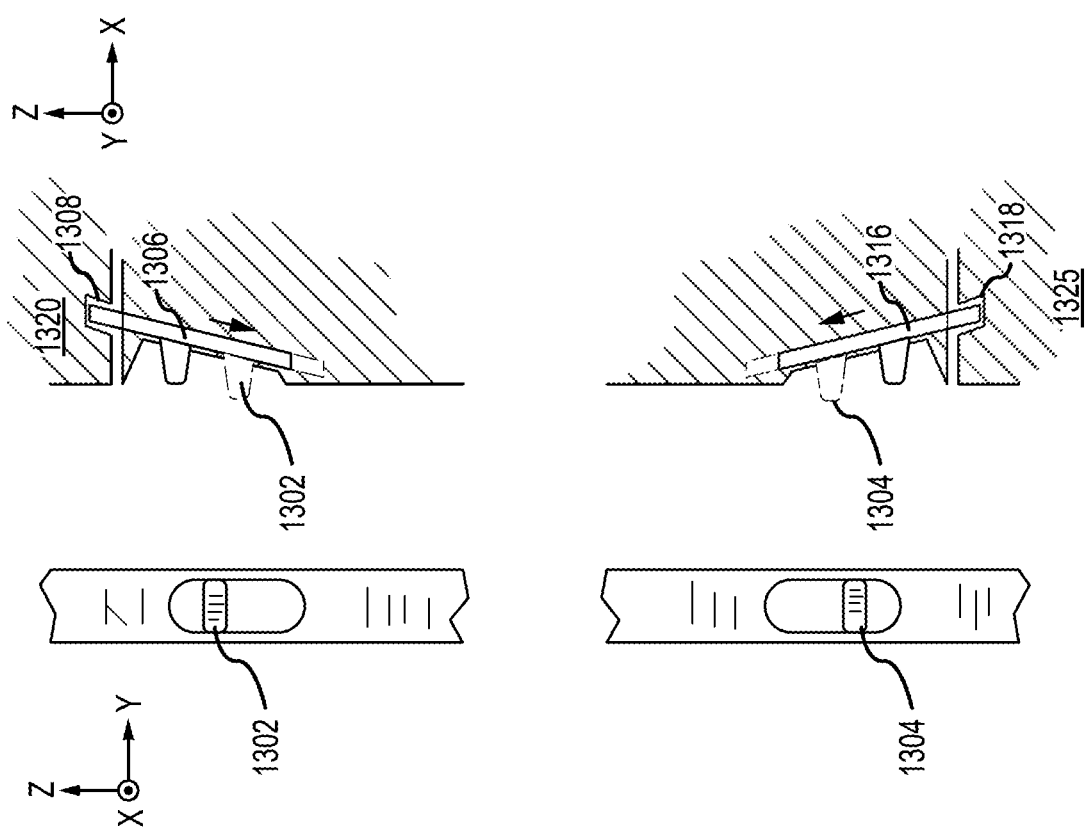

Referring now to FIG. 13, in accordance with various embodiments, latching mechanisms on movable wall 230 of a lavatory monument 104, 106, or 108 is illustrated. In various embodiments, handle 1302 is affixed to a pin portion 1306 within front panel 245. In various embodiments, in a locked position, handle 1302 is forced upward in a substantially positive z-direction thereby forcing the pin portion 1306 upward, i.e., in a substantially positive z-direction, such that pin portion 1306 engages with a slot 1308 in the ceiling 1320 of the aircraft. In various embodiments, to move to an unlocked position, handle 1302 is forced downward in a substantially negative z-direction thereby forcing the pin portion 1306 downward, i.e., in a substantially negative z-direction, such that pin portion 1306 disengages with a slot 1308 in the ceiling 1320 of the aircraft. In various embodiments, handle 1312 is affixed to a pin portion 1306 within front panel 245. In various embodiments, in a locked position, handle 1312 is forced downward in a substantially negative z-direction thereby forcing the pin portion 1316 downward, i.e., in a substantially negative z-direction, such that the pin portion 1316 engages with a slot 1318 in the floor 1325 of the aircraft. In various embodiments, to move to an unlocked position, handle 1312 is forced upward in a substantially positive z-direction thereby forcing the pin portion 1316 upward, i.e., in a substantially positive z-direction, such that the pin portion 1316 disengages with a slot 1318 in the floor 1325 of the aircraft.

Figure 14A:
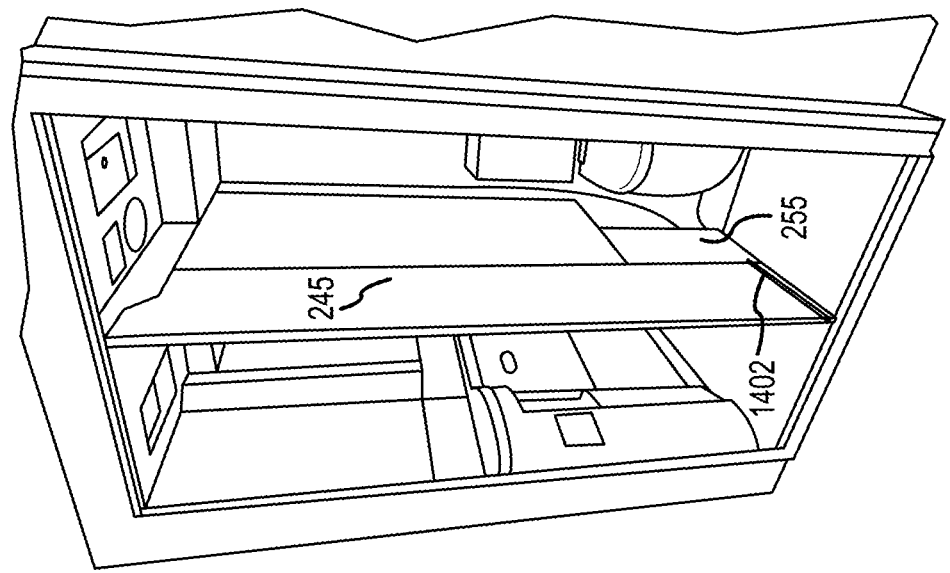
FIGS. 14A and 14B illustrate latching mechanisms for locking/unlocking a kickout panel to a front panel on a movable wall of a lavatory monument, in accordance with various embodiments.
Figure 14A:
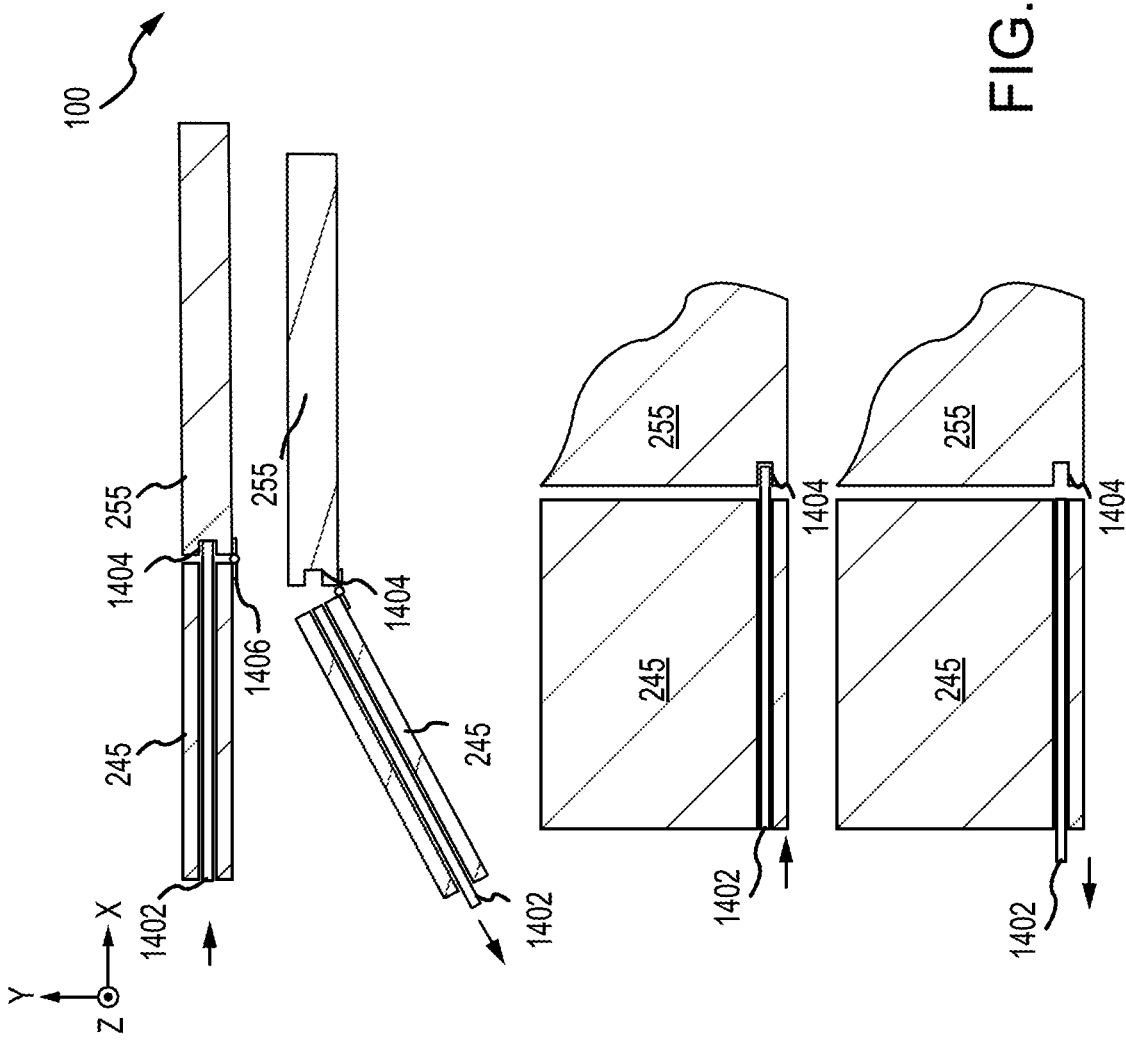
Figure 14B:
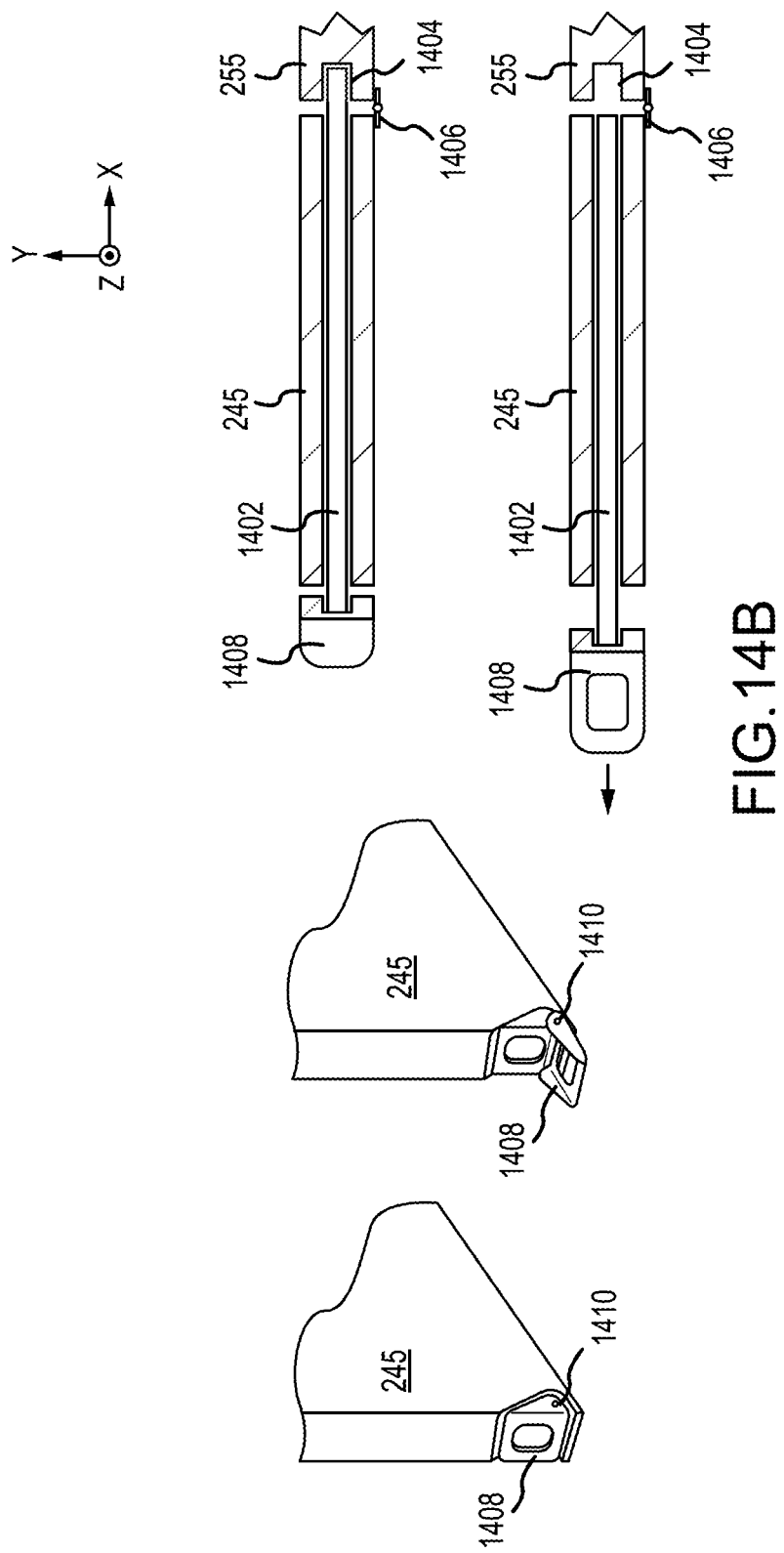

Referring now to FIGS. 14A and 14B, in accordance with various embodiments, latching mechanisms for locking/unlocking the kickout panel 255 to front panel 245 on movable wall 230 of a lavatory monument 104, 106, or 108 is illustrated. As illustrated in FIG. 14A, in various embodiments, pin 1402, contained within front panel 245 translates in a positive x-direction, in a locked position, and in a negative x-direction, in an unlocked position. In various embodiments, a distal end of pin 1402, in the locked position, protrudes into slot 1404 in kickout panel 255 thereby preventing the kickout panel 255 from rotating, i.e., about the z-axis in a clockwise direction, via hinge 1406 that hingedly couples the front panel 245 to the kickout panel 255. In various embodiments, in an unlocked position, the distal end of pin 1402 translates in a negative x-direction such that the distal end of the pin 1402 disengages with a slot 1404 thereby allowing kickout panel 255 to rotate, i.e., about the z-axis in a clockwise direction, via the hinge 1406 that hingedly couples the front panel 245 to the kickout panel 255.

As illustrated in FIG. 14B, a proximal end of the pin 1402 may be pivotably coupled on to a handle 1408 via shaft 1410. In a locked position, handle 1408 is positioned in a substantially positive z-direction and contained within the outer edge of the front panel 245. In an unlocked position, handle 1408 is rotated to a substantially negative x-direction. In various embodiments, a user pulls handle 1408 thereby translating the distal end of pin 1402 in a negative x-direction such that the distal end of the pin 1402 disengages with a slot 1404 thereby allowing kickout panel 255 to rotate, i.e., about the z-axis in a clockwise direction, via the hinge 1406 that hingedly couples the front panel 245 to the kickout panel 255.

Figure 15:
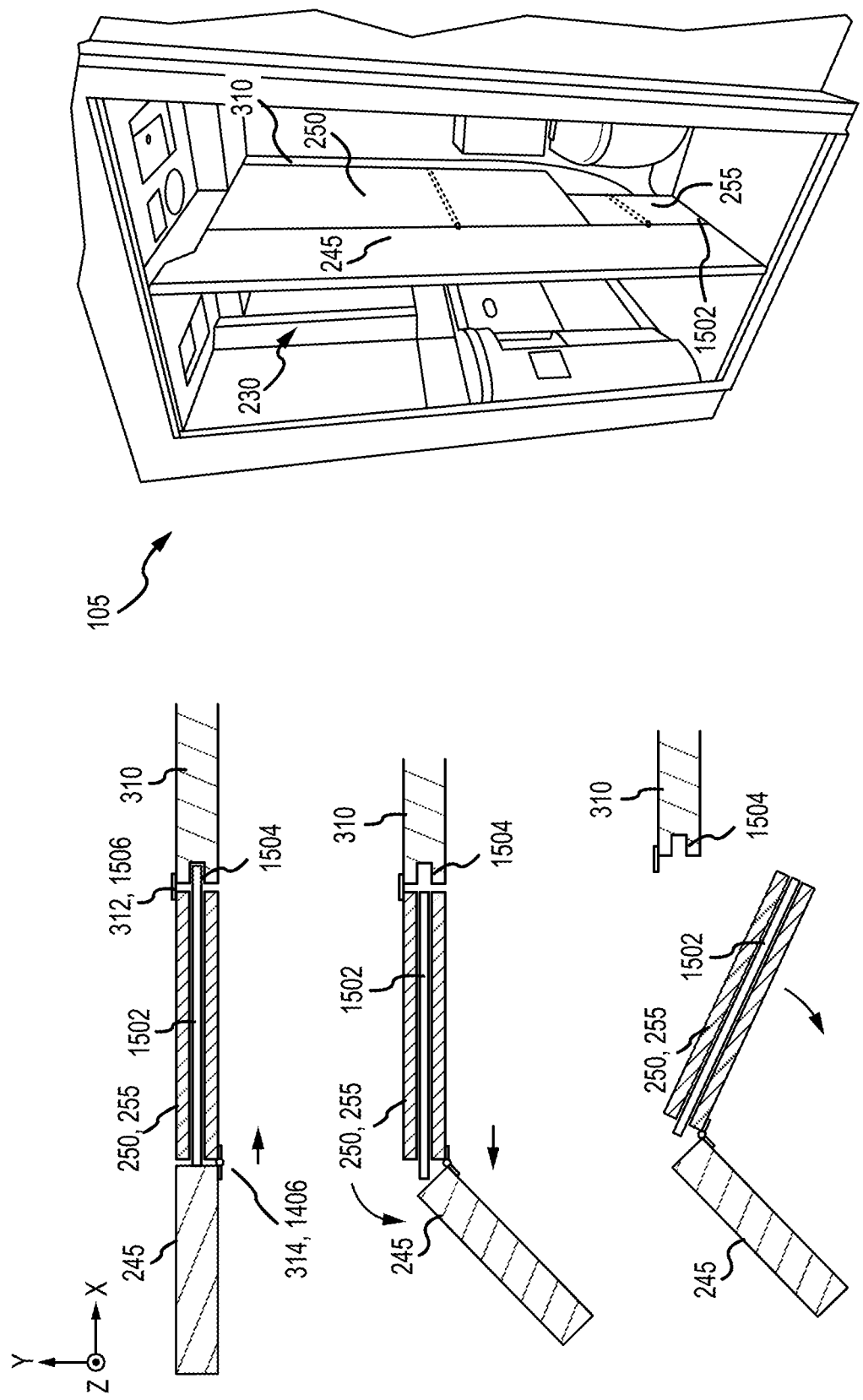
FIG. 15 illustrates latching mechanisms for locking/unlocking a kickout panel and a rear panel to a front panel on a movable wall of a lavatory monument, in accordance with various embodiments.

Referring now to FIG. 15, in accordance with various embodiments, latching mechanisms for locking/unlocking the kickout panel 255 and rear panel 250 to the front panel 245 on movable wall 230 of a lavatory monument 104, 106, or 108 is illustrated. In various embodiments, pin 1502 contained within the rear panel 250 and similarly within the kickout panel 255 translates in a positive x-direction, in a locked position, and in a negative x-direction, in an unlocked position. Regarding the rear panel 250, in various embodiments, a distal end of pin 1502, in the locked position, protrudes into slot 1504 in the frame segment 310 thereby preventing the rear panel 250 from rotating, i.e., about the z-axis in a clockwise direction, via hinge 312 that hingedly couples the rear panel 250 to the frame segment 310. Regarding the kickout panel 255, in various embodiments, a distal end of pin 1502, in the locked position, protrudes into slot 1504 in the frame segment 310 thereby preventing the kickout panel 255 from rotating, i.e., about the z-axis in a clockwise direction via hinge 1406 or in a counterclockwise direction past door stop 1506. In various embodiments, as the front panel 245 rotates about hinge 324 that couples the rear panel 250 to the front panel 245 or hinge 1406 that couples the kickout panel 255 to the front panel 245 such that the movable wall transitions to an unlocked position, the distal end of pin 1502 translates in a negative x-direction such that the distal end of the pin 1502 disengages with a slot 1504 thereby allowing the rear panel 250 to rotate, i.e., about the z-axis in a clockwise direction, via the hinge 314 that hingedly couples the front panel 245 to the rear panel 250 and, similarly, allowing the kickout panel 255 to rotate, i.e., about the z-axis in a clockwise direction, via the hinge 1406 that hingedly couples the front panel 245 to the kickout panel 255.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft lavatory monument, comprising:
a first lavatory comprising a first door providing access to the first lavatory from an aisle of an aircraft;
a second lavatory proximate the first lavatory, the second lavatory comprising a second door providing access to the second lavatory from the aisle of the aircraft; and
a movable wall disposed between the first lavatory and the second lavatory, the movable wall including a latching mechanism positioned on an exterior edge of the movable wall and accessible from the aisle of the aircraft,
wherein the latching mechanism, responsive to being in a locked position, causes the movable wall to be positioned at a first position separating the first lavatory from the second lavatory and providing privacy therebetween,
wherein the latching mechanism, responsive to being in an unlocked position, allows the movable wall to collapse thereby forming an enlarged bathroom space including the first lavatory and the second lavatory,
wherein the movable wall comprises a front panel, a rear panel, and a kickout panel,
wherein the rear panel comprises a first pin, wherein the kickout panel comprises a second pin,
wherein, responsive to the front panel being in the locked position, the front panel causes the first pin to protrude from a distal end of the rear panel thereby engaging a first slot in a frame segment of the aircraft and preventing the rear panel from rotating, and
wherein, responsive to the front panel being in the locked position, the front panel causes the second pin to protrude from the distal end of the kickout panel thereby engaging a second slot in the frame segment of the aircraft and preventing the kickout panel from rotating.

2. The aircraft lavatory monument of claim 1, wherein the latching mechanism is two latching mechanisms and wherein a first of the two latching mechanisms is located toward an upper portion of the exterior edge of the movable wall and accessible from the aisle of the aircraft.

3. The aircraft lavatory monument of claim 1, wherein the latching mechanism comprises a handle portion, a linking portion, and a pin portion and wherein, in the locked position, the handle portion is positioned within the exterior edge of the movable wall forcing the pin portion into a slot of a ceiling or a floor of the aircraft via the linking portion.

4. The aircraft lavatory monument of claim 3, wherein, in the unlocked position, the handle portion extends from the exterior edge of the movable wall forcing the pin portion out of the slot of the ceiling or the floor of the aircraft via the linking portion.

5. The aircraft lavatory monument of claim 1, wherein the latching mechanism comprises a handle portion, a circular portion, and a pin portion, wherein, in the locked position, the handle portion is positioned within the exterior edge of the movable wall forcing a distal end of the pin portion into a slot of a ceiling or a floor of the aircraft via a slot in the circular portion, and wherein, in the locked position, a proximal end of the pin portion is positioned at a first distance within the circular portion.

6. The aircraft lavatory monument of claim 5, wherein, in the unlocked position, the handle portion extends from the exterior edge of the movable wall forcing the distal end of the pin portion out of the slot of the ceiling or the floor of the aircraft via the slot in the circular portion, and wherein, in the unlocked position, the proximal end of the pin portion is positioned at a second distance within the circular portion, wherein the second distance is greater than the first distance.

7. The aircraft lavatory monument of claim 1, wherein the latching mechanism comprises a handle portion and a pin portion and wherein, in the locked position, the handle portion is positioned within the exterior edge of the movable wall forcing the pin portion into a slot of a ceiling or a floor of the aircraft via a slot in the handle portion.

8. The aircraft lavatory monument of claim 7, wherein, in the unlocked position, the handle portion extends from the exterior edge of the movable wall forcing the pin portion out of the slot of the ceiling or the floor of the aircraft via the slot in the handle portion.

9. The aircraft lavatory monument of claim 1, wherein the latching mechanism comprises a tab portion, a bolt portion, and a pin portion, wherein the tab portion rotates to about a face portion of the bolt portion, and wherein, responsive to force being applied to the tab portion, the bolt portion rotates forcing the pin portion out of a slot of a floor of the aircraft.

10. The aircraft lavatory monument of claim 1, wherein the latching mechanism comprises a handle portion, a shaft portion, a gear portion, and at least one pin portion and wherein, in the locked position, the handle portion is positioned within the exterior edge of the movable wall such that the gear portion that is coupled to the handle portion via the shaft portion forces the at least one pin portion into a slot of a ceiling or a floor of the aircraft.

11. The aircraft lavatory monument of claim 10, wherein, in the unlocked position, the handle portion rotates so as to extend from sides of the movable wall and thereby rotate the shaft portion and the gear portion such that the gear portion that is coupled to the handle portion via the shaft portion forces the at least one pin portion out of the slot of the ceiling or the floor of the aircraft.

12. The aircraft lavatory monument of claim 1, wherein the latching mechanism comprises a handle portion, a shaft portion, a gear portion, and at least one pin portion and wherein, in the locked position, the handle portion is positioned within the exterior edge of the movable wall such that the gear portion that is coupled to the handle portion via the shaft portion forces the at least one pin portion into a slot of a ceiling or a floor of the aircraft.

13. The aircraft lavatory monument of claim 12, wherein, in the unlocked position, the handle portion rotates so as to extend from the exterior edge of the movable wall and thereby rotate the shaft portion and the gear portion such that the gear portion that is coupled to the handle portion via the shaft portion forces the at least one pin portion out of the slot of the ceiling or the floor of the aircraft.

14. The aircraft lavatory monument of claim 1, wherein the latching mechanism comprises a handle portion and a pin portion and wherein, in the locked position, the handle portion is positioned within the exterior edge of the movable wall forcing the pin portion into a slot of a ceiling or a floor of the aircraft.

15. The aircraft lavatory monument of claim 14, wherein, in the unlocked position, the handle portion extends from the exterior edge of the movable wall forcing the pin portion out of the slot of the ceiling or the floor of the aircraft.

16. The aircraft lavatory monument of claim 1, wherein the movable wall comprises a front panel and a kickout panel and wherein the front panel comprises a pin that, in the locked position, protrudes from a distal end of the front panel engaging a slot in the kickout panel thereby preventing the kickout panel from rotating.

17. The aircraft lavatory monument of claim 16, wherein the pin, in the unlocked position, retracts into the front panel from the slot in the kickout panel thereby allowing the kickout panel to rotate.

18. The aircraft lavatory monument of claim 1, wherein, responsive to the front panel being in the unlocked position, the front panel causes the first pin to retract into the rear panel thereby disengaging the first pin from the first slot in the frame segment of the aircraft and allowing the rear panel to rotate, and wherein, responsive to the front panel being in the unlocked position, the front panel causes the second pin to retract into the kickout panel thereby disengaging the second pin from the second slot in the frame segment of the aircraft and allowing the kickout panel to rotate.

19. A method of locking and unlocking a movable wall of a lavatory monument within an aircraft, the method comprising:
    transitioning a latching mechanism positioned on an exterior edge of the movable wall and accessible from an aisle of the aircraft from a first position to a second position,
    wherein, in the first position, the movable wall is positioned to separate a first lavatory from a second lavatory thereby providing privacy therebetween,
    wherein, in the second position, the movable wall collapses thereby forming an enlarged bathroom space including the first lavatory and the second lavatory,
    wherein the movable wall comprises a front panel, a rear panel, and a kickout panel,
    wherein the rear panel comprises a first pin, wherein the kickout panel comprises a second pin,
    wherein, responsive to the front panel being positioned to separate the first lavatory from the second lavatory thereby providing privacy therebetween, the front panel causes the first pin to protrude from a distal end of the rear panel thereby engaging a first slot in a frame segment of the aircraft and preventing the rear panel from rotating, and
    wherein, responsive to the front panel being positioned to separate the first lavatory from the second lavatory thereby providing privacy therebetween, the front panel causes the second pin to protrude from the distal end of the kickout panel thereby engaging a second slot in the frame segment of the aircraft and preventing the kickout panel from rotating.

* * * * *